(12) United States Patent
Huang et al.

(10) Patent No.: US 9,602,656 B2
(45) Date of Patent: Mar. 21, 2017

(54) METHOD, APPARATUS AND SYSTEM FOR PROVIDING CALLER IDENTIFICATION

(71) Applicant: iHandy Inc., Tortola (VG)

(72) Inventors: Yangqing Huang, Beijing (CN); Jinfei Zhang, Beijing (CN)

(73) Assignee: IHANDY INC., Tortola (VG)

( * ) Notice: Subject to any disclaimer, the term of this patent is extended or adjusted under 35 U.S.C. 154(b) by 159 days.

(21) Appl. No.: 14/256,990

(22) Filed: Apr. 20, 2014

(65) Prior Publication Data

US 2015/0304490 A1    Oct. 22, 2015

(51) Int. Cl.
*H04M 3/42*    (2006.01)

(52) U.S. Cl.
CPC ... *H04M 3/42042* (2013.01); *H04M 3/42059* (2013.01)

(58) Field of Classification Search
CPC ...................................................... H04W 4/16
See application file for complete search history.

(56) References Cited

U.S. PATENT DOCUMENTS

| | | | | |
|---|---|---|---|---|
| 8,295,819 B1* | 10/2012 | Kaplan | ............. | H04M 3/42042 379/88.19 |
| 2005/0287997 A1* | 12/2005 | Fournier | ............... | H04W 88/02 455/415 |
| 2006/0120308 A1* | 6/2006 | Forbes | ............. | H04M 3/42042 370/260 |
| 2007/0201635 A1 | 8/2007 | Zhao | | |
| 2008/0259887 A1* | 10/2008 | Naqvi | ................... | H04M 7/123 370/338 |
| 2010/0220843 A1* | 9/2010 | Bosan | ............... | H04M 1/72519 379/88.22 |
| 2012/0278443 A1* | 11/2012 | Taniuchi | ............. | G06F 17/3089 709/219 |
| 2015/0111548 A1* | 4/2015 | Ali | ......................... | H04W 4/16 455/415 |

* cited by examiner

*Primary Examiner* — Hassan Kizou
*Assistant Examiner* — Abdullahi Ahmed
(74) *Attorney, Agent, or Firm* — Anova Law Group, PLLC

(57) ABSTRACT

Various embodiments provide methods, apparatus, and systems for providing caller ID. In an exemplary method implemented on a caller device, a portrait file to be used as a caller ID is created, and sent to a portrait distribution system (PDS) on a server via an IP network. A distribution policy corresponding to the portrait file is generated, and sent to a policy control system (PCS) on the server via the IP network, to cause the PCS to perform a selective distribution process. The selective distribution process includes selecting a callee device by using the distribution policy, generating a notification, and sending the notification to the callee device, such that the callee device downloads the portrait file from the PDS via the IP network according to the notification and executes the portrait file as the caller ID when the caller device calls the callee device.

24 Claims, 18 Drawing Sheets

METHOD, APPARATUS AND SYSTEM FOR PROVIDING CALLER IDENTIFICATION

FIELD OF THE DISCLOSURE

The present disclosure relates to the field of communication systems and, more particularly, relates to methods, apparatus and systems for providing caller identification.

BACKGROUND

With continuous development of communication technology, users have increasing demands for functionalities of communication devices. Mobile phones, such as feature phone and smart phone, have users across the entire globe. Smart phone, as a popular communication device nowadays, has independent operation system as a personal computer and includes features such as web browsing, Wi-Fi. User can install on a smart phone various third-party programs such as application software, games, and global positioning system. Existing smart phone operation systems include, e.g., Android, iOS, and Windows Phone.

Generally, the existing smart phone operation systems have built-in address book system and phone system. When a caller dials a phone number on a phone to call a callee, the phone of the callee receives the call. If the caller is a contact in the address book on the phone of the callee and has a corresponding portrait in the address book, the portrait of the caller can be automatically displayed on the phone of the callee to indicate the caller identification (ID). Thus, caller ID can be displayed in a personalized way.

Typically, portrait of a contact is set up in the address book manually by a callee. In this case, the callee can store a phone number in the address book and assign a picture to the phone number. When the callee is called by a caller, the portrait can be displayed as the caller ID of the caller. Such a method is time-consuming for a callee. Therefore, usually a significant number of contacts in an address book still do not have a portrait assigned, and have only the caller's phone number or name displayed as caller ID. Therefore, existing method for managing address book and setting caller ID is inefficient. The disclosed methods and devices are directed to solve one or more problems set forth above and other problems.

BRIEF SUMMARY OF THE DISCLOSURE

One aspect of the present disclosure includes methods for providing caller identification (ID). An exemplary method can be implemented by a caller device having a phone number. The method can include creating a portrait file to be used as a caller ID representing the caller device. A distribution policy corresponding to the portrait file can be generated. The portrait file can be sent to a portrait distribution system (PDS) on a server via an IP network. The distribution policy can be sent to a policy control system (PCS) on the server via the IP network, to cause the PCS to perform a selective distribution process. The selective distribution process can include selecting a callee device to be notified of the portrait file, by using the distribution policy. Further, the selective distribution process can include generating a notification based on the portrait file. Still further, the selective distribution process can include sending the notification to the callee device, such that the callee device downloads the portrait file from the PDS via the IP network according to the notification and executes the portrait file as the caller ID when the caller device calls the callee device.

Another aspect of the present disclosure includes methods for providing caller ID. An exemplary method can be implemented by a server including a PDS and a PCS. The PDS can receive, from a caller device via an IP network, a portrait file to be used as a caller ID representing the caller device. The caller device can have a phone number. The PCS can receive, from the caller device via the IP network, a distribution policy corresponding to the portrait file. The PCS can perform a selective distribution process. The selective distribution process can include selecting a callee device to be notified of the portrait file, by using the distribution policy. Further, the selective distribution process can include generating a notification based on the portrait file. Still further, the selective distribution process can include sending the notification to the callee device to cause the callee device to download the portrait file from the PDS via the IP network according to the notification and, when the caller device calls the callee device, to cause the callee device to execute the portrait file as the caller ID.

Another aspect of the present disclosure includes an apparatus for providing caller ID. The apparatus can include a caller device having a phone number. The caller device can include a processor, a storage medium, and can have instructions encoded thereon which cause the apparatus to perform a method for providing a called ID. In the method, a portrait file to be used as a caller ID representing the caller device can be created. A distribution policy corresponding to the portrait file can be generated. The portrait file can be sent to a portrait distribution system (PDS) on a server via an IP network. The distribution policy can be sent to a policy control system (PCS) on the server via the IP network, to cause the PCS to perform a selective distribution process. The selective distribution process can include selecting a callee device to be notified of the portrait file, by using the distribution policy. Further, the selective distribution process can include generating a notification based on the portrait file. Still further, the selective distribution process can include sending the notification to the callee device, such that the callee device downloads the portrait file from the PDS via the IP network according to the notification and executes the portrait file as the caller ID when the caller device calls the callee device.

Another aspect of the present disclosure includes an apparatus for providing caller ID. The apparatus can include a server having a PCS and a PDS. The server can include a processor, a storage medium, and can have instructions encoded thereon, which cause the apparatus to perform a method for providing a called ID. In the method, the PDS can receive, from a caller device via an IP network, a portrait file to be used as a caller ID representing the caller device. The caller device can have a phone number. The PCS can receive, from the caller device via the IP network, a distribution policy corresponding to the portrait file. The PCS can perform a selective distribution process. The selective distribution process can include selecting a callee device to be notified of the portrait file, by using the distribution policy. Further, the selective distribution process can include generating a notification based on the portrait file. Still further, the selective distribution process can include sending the notification to the callee device, to cause the callee device to download the portrait file from the PDS via the IP network according to the notification and, when the caller device calls the callee device, to cause the callee device to execute the portrait file as the caller ID.

Other aspects or embodiments of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
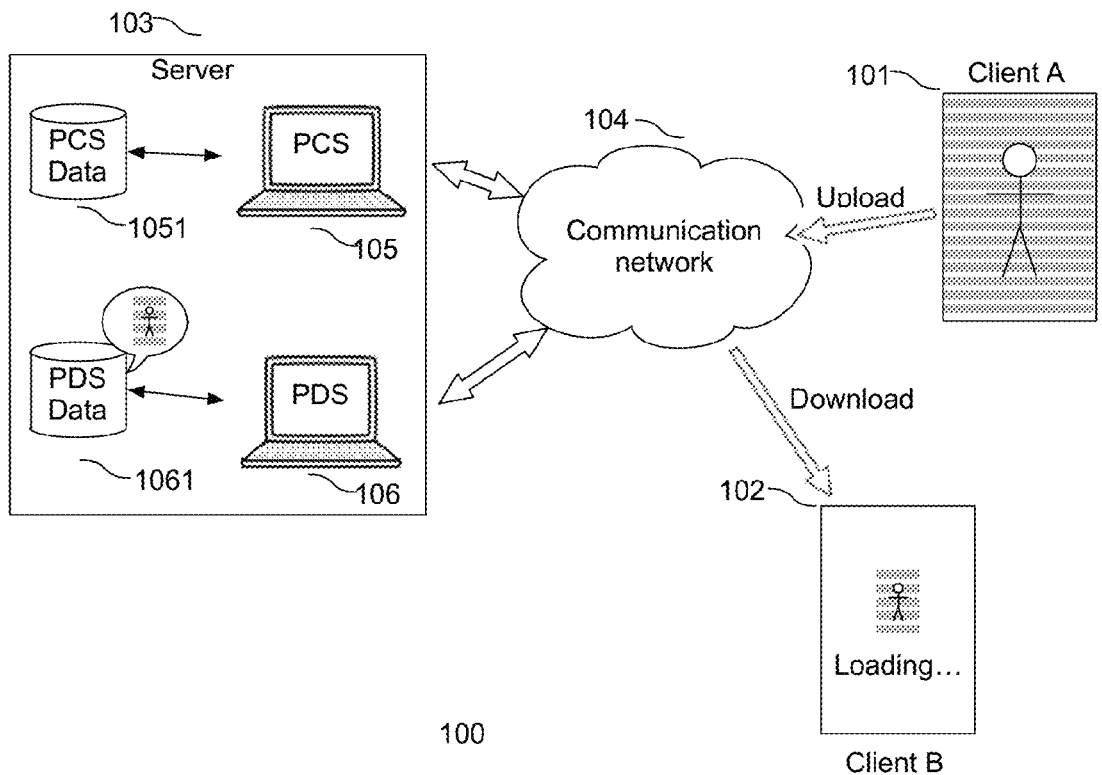
FIG. 1 depicts an exemplary environment incorporating certain disclosed embodiments.

FIG. 1 depicts an exemplary environment 100 incorporating exemplary methods, apparatus and systems for displaying caller ID in accordance with various disclosed embodiments. As shown in FIG. 1, the environment 100 can include a server 103, a client A 101, a client B 102, and a communication network 104. The server 103, the client A 101 and the client B 102 may be coupled through the communication network 104 for information exchange including, e.g., sending/receiving portrait files, distribution policy, notification, etc. Although only two clients and one server are shown in the environment 100, any number of clients or servers may be included, and other devices may also be included.

The communication network 104 may include any appropriate type of communication network for providing network connections to the server 103, the client A 101 and the client B 102, or among multiple servers or clients. For example, the communication network 104 may include the Internet, a local area network (LAN), a mobile communication network, or any other types of computer networks or telecommunication networks, either wired or wireless.

In certain embodiments, the communication network 104 may include an Internet Protocol (IP) network that can be used by a mobile terminal, e.g., a smart phone or a feature phone. The IP network can be supported by Wireless Fidelity (Wi-Fi) (e.g., the American Institute of Electrical and Electronics engineers standard IEEE 802.11a, IEEE 802.11b, IEEE802.11g, and/or IEEE 802.11n), or by any appropriate cellular data networks including, e.g., General Packet Radio Service (GPRS), 3G, 4G, 5G, Nomadic Local Area Wireless Access (NoLA), etc.

A client, as used herein, may refer to any appropriate software program that can implement certain functions. A client can be installed on a terminal device to be operated by a user to accomplish the certain functions. The terminal device can include any electronic device having certain computing capabilities, e.g., a personal computer (PC), a work station computer, a hand-held computing device (e.g., a tablet), a mobile terminal (e.g., a mobile phone, a feature phone, or a smart phone), or any other client-side computing device. One terminal can implement one or more clients.

In various embodiments, the client A 101 can be implemented by a first terminal of a first user. The client B 102 can be implemented by a second terminal of a second user. For illustrative purposes, the first user can be referred to as a caller, and the first terminal of the first user can be referred to a caller device. The second user can be referred to as a callee, and the second terminal of the second user can be referred to a callee device. As used herein, wherever applicable, a caller device can refer to a device that places or sends a phone call, or a device that can potentially place or send a phone call. A callee device can refer to a device that receives a phone call, or a device that can potentially receive a phone call.

The Client A 101 can include a caller active system (CAS). The CAS can include a portrait-collecting sub-system configured to collect, create, or obtain a portrait file. The CAS can further include a distribution-policy-setting sub-system configured to collect user input in order to generate a distribution policy corresponding to the portrait file.

The Client B 102 can include a potential callee passive system (PCPS). The PCPS can include a portrait-obtaining sub-system configured to obtain a portrait file. The PCPS can further include a portrait-setting sub-system configured to correlate the portrait with a caller or caller device, such that when the caller device calls the callee device, the portrait file can be played or executed on the callee device during a ringing prompt, e.g., an image included in the portrait file can be displayed on the monitor of the callee device. Further, one client can have one of CAS and PCPS installed, or have both CAS and PCPS installed, without limitation.

A server, as used herein, may refer to one or more server computers configured to provide certain server functionalities. The server may also include one or more processors to execute computer programs in parallel.

In various embodiments, the server 103 can include a policy control system (PCS) 105, and a portrait distribution system (PDS) 106. The PCS 105 can be configured to store distribution policy and control distribution of portrait files. The PCS 105 can include a PCS data storage unit 1051 for storing distribution policy and any appropriate database management system for managing the distribution policy. Optionally, the PCS data storage unit 1051 can include persistent storage (PS).

The PDS 106 can be configured to store and distribute the portrait files. The PDS 106 can include a PDS data storage unit 1061 for storing portrait files, e.g., a portrait as indicated by the bubble in FIG. 1. Optionally, the PDS data storage unit 1061 can include persistent storage (PS). The PCS 105, the PCS data storage unit 1051, the PDS 106 and the PDS data storage unit 1061 can be located on the same server computer or on separate server computers, without limitation.

Figure 2:
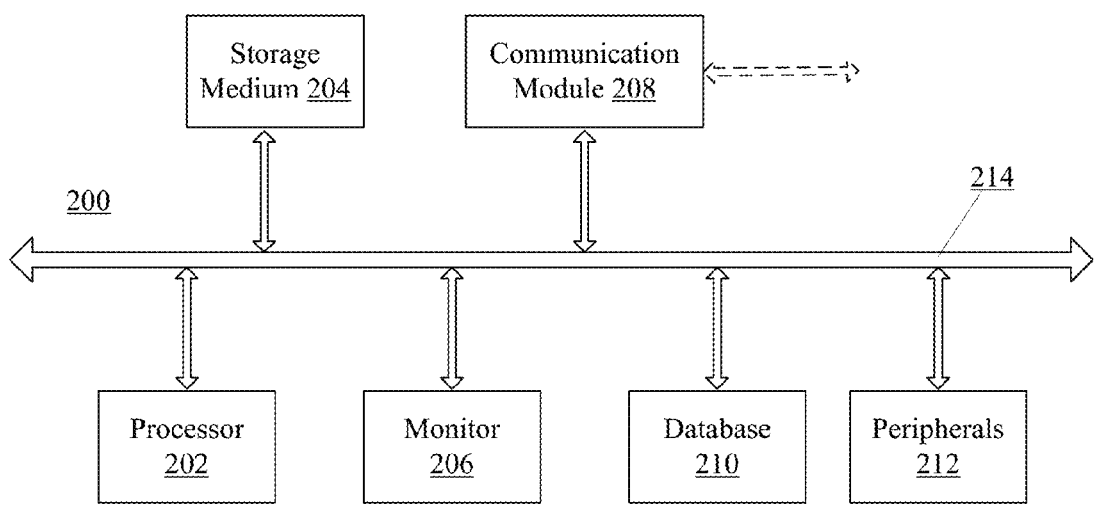
FIG. 2 depicts an exemplary computing system consistent with the disclosed embodiments.

The server 103, the first terminal implementing the Client A 101 and the second terminal implementing the Client B 102 may be implemented on any appropriate computing platform. FIG. 2 shows a block diagram of an exemplary computing system 200 capable of implementing the server 103, the first terminal and/or the second terminal. As shown in FIG. 2, the exemplary computing system 200 may include a processor 202, a storage medium 204, a monitor 206, a communication module 208, a database 210, peripherals 212, and one or more bus 214 to couple the devices together. Certain devices may be omitted and other devices may be included.

The processor 202 can include any appropriate processor or processors. Further, the processor 202 can include multiple cores for multi-thread or parallel processing. The storage medium 204 may include memory modules, e.g., Read-Only Memory (ROM), Random Access Memory (RAM), and flash memory modules, and mass storages, e.g., CD-ROM, U-disk, removable hard disk, etc. In various embodiments, the storage medium 204 may include a persistent storage (PS) memory unit to store portrait files, e.g., portrait, or store distribution policy, when executed by the processor 202.

The monitor 206 may include display devices for displaying contents in the computing system 200. For example, when the computing system 200 implements a mobile phone, the monitor 206 can be configured to display images and display caller ID when there is an incoming call. The monitor 206 may include a touch screen.

The peripherals 212 may include I/O devices such as keyboard, mouse, and/or a built-in camera. The peripherals 212 may further include an audio circuit, coupled with a speaker, an audio jack, and a microphone. The audio circuit can provide an audio interface between a user and the computing system 200. For example, the audio circuit is configured to receive audio data from the processor 202, convert the audio data to an electrical signal, and transmit the electrical signal to the speaker. The speaker is configured to convert the electrical signal to an audio signal output (e.g., sound waves that can be heard by human ear). On the other hand, the audio circuit is configured to receive an electrical signal from the microphone, convert the electrical signal to audio data, and transmit the audio data to the processor 202 for further processing. In certain examples, the audio data can be received from the storage medium 204 or the communication module 208. In addition, the audio data can be stored in the storage medium 204 for further processing, or be transmitted via the communication module 208.

The communication module 208 may include network devices for establishing connections through the communication network 104. The communication module 208 may include a radio frequency (RF) module configured to receive and transmit electromagnetic waves. Thus, conversion between the electromagnetic waves and electrical signals can be accomplished, such that the communication module 208 can communicate with communication networks or other communication devices. The RF module may include any suitable circuit elements that perform the functions of the RF module, including, e.g., an antenna, an RF transceiver, a digital signal processor, an encryption/decryption chip, a subscriber identity module (SIM) card, memory, etc.

The database 210 may include one or more databases for storing certain data and for performing certain operations on the stored data, e.g., portrait files, user phone number or account information, distribution policy, or any other suitable data.

In operation, the client A 101 and/or the client B 102 may cause the server 103 to perform certain actions, e.g., receiving portrait files from a client, receiving distribution policy from a client, sending notifications, etc. The server 103 may be configured to provide structures and functions for such actions and operations. The disclosed methods can be accomplished using any appropriate operating system including, but not limited to, iOS, Android, Windows Phone.

In various embodiments, a caller device involved in the disclosed methods and systems can include the first terminal implementing Client A 101, a callee device involved in the disclosed methods and systems can include the second terminal implementing Client B 102, while a server involved in the disclosed methods and systems can include the server 103. The methods, apparatus, and systems disclosed in accordance with various embodiments can be executed by one or more computing systems, including, the server, the first terminal and/or the second terminal.

Figure 3:
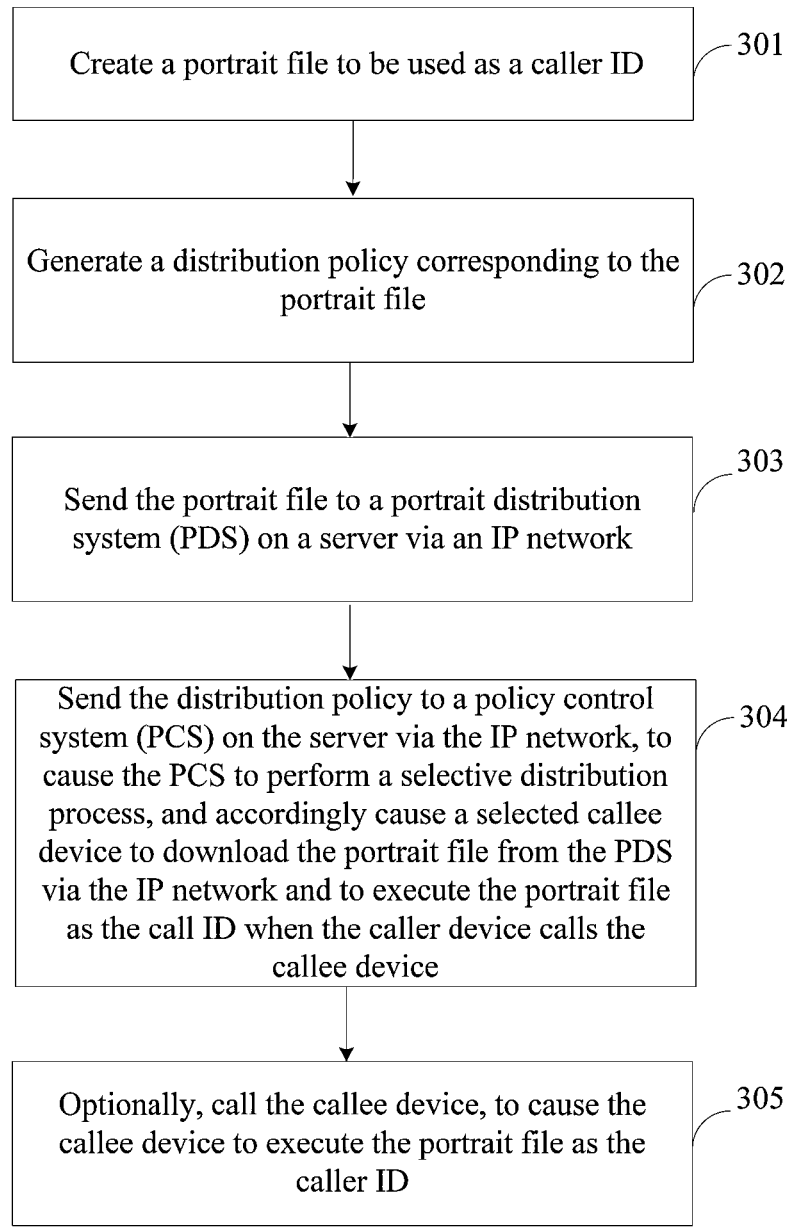
FIG. 3 depicts an exemplary method for providing user ID in accordance with various disclosed embodiments.

FIG. 3 depicts an exemplary method of providing user ID in accordance with various disclosed embodiments. The exemplary method can be implemented by a caller device.

Referring to FIG. 3, in Step 301, the caller device creates a portrait file to be used as a caller ID. As used herein, a portrait refers to contents that can represent an identity and/or convey information. A portrait can include image(s), text(s), animation(s), audio(s), video(s) and/or any other appropriate types of multimedia content. A portrait file refers to a file that contains a portrait when properly read and executed by a computing system. The portrait file can be subsequently, executed on a callee device, as a caller ID representing the caller device or the user of the caller device. Executing a portrait file can refer to a process of carrying out instructions in the portrait file by any appropriate computer program. Executing a portrait file can include, e.g., displaying an image or animation included in the portrait file, playing a video or audio clip included in the portrait file, and the like.

Figure 4A:
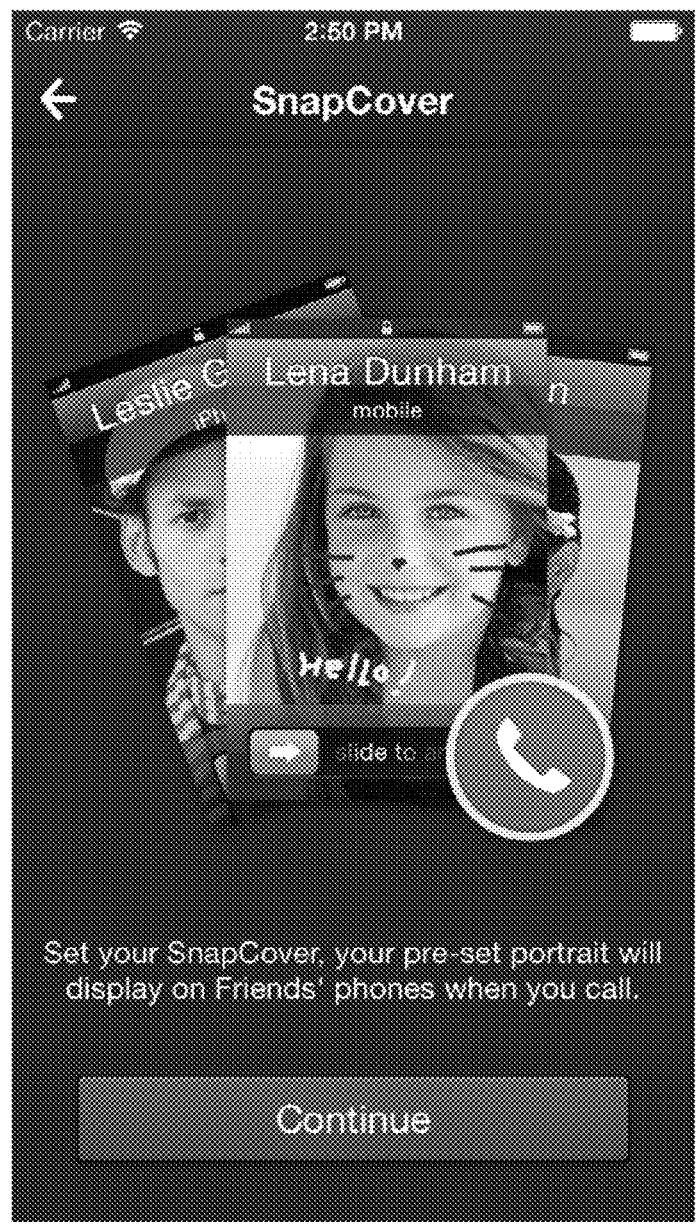
FIG. 4A depicts an exemplary interface for launching a caller active system (CAS) in accordance with various disclosed embodiments.

For example, the caller device can launch the CAS that is previous installed thereon, and use the CAS to collect the portrait file. FIG. 4A depicts an exemplary interface for launching a CAS in accordance with various disclosed embodiments. In this example, the CAS can be named as SnapCover application program.

Figure 4B:
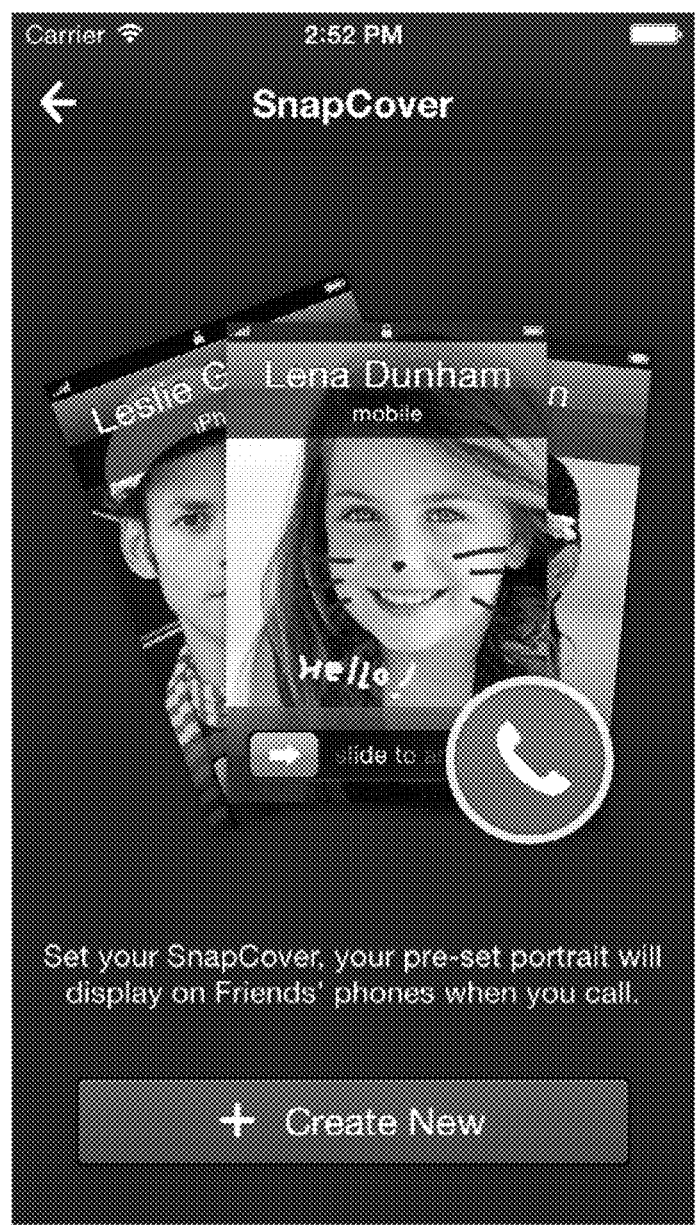
FIG. 4B depicts an exemplary interface for creating a new portrait file in accordance with various disclosed embodiments.

FIG. 4B depicts an exemplary interface for creating a new portrait file in accordance with various disclosed embodiments. The CAS may prompt the user of the caller device to create a new portrait file.

Figure 4C:
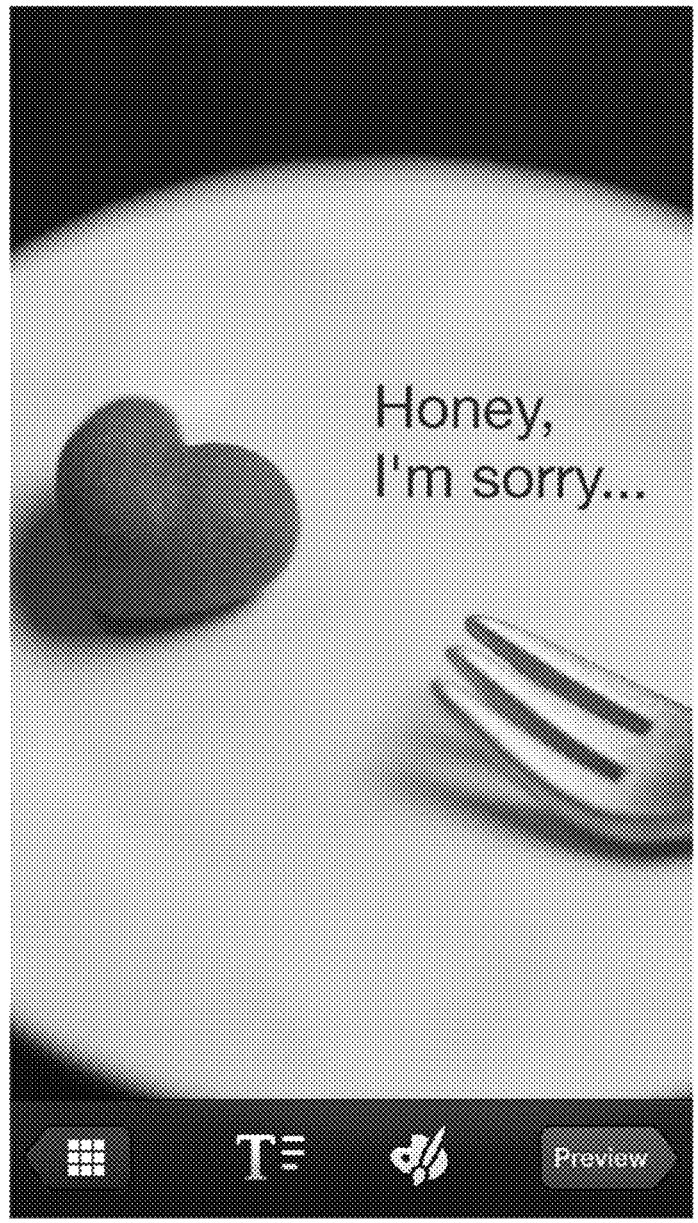
FIG. 4C depicts an exemplary interface for editing a portrait file in accordance with various disclosed embodiments.

When the portrait file includes an image, the image can be created in various ways. In example, the portrait can be created by taking a photo using the caller device. In another example, the portrait can be created by selecting an image that is saved locally on the caller device. Optionally, the CAS can provide various image processing and editing functions including, but not limited to, zooming, filtering, painting or graffiti, text inserting, text editing, or any other appropriate functions. FIG. 4C depicts an exemplary interface for editing a portrait file in accordance with various disclosed embodiments. Therefore, the portrait can be further customized.

Figure 4D:
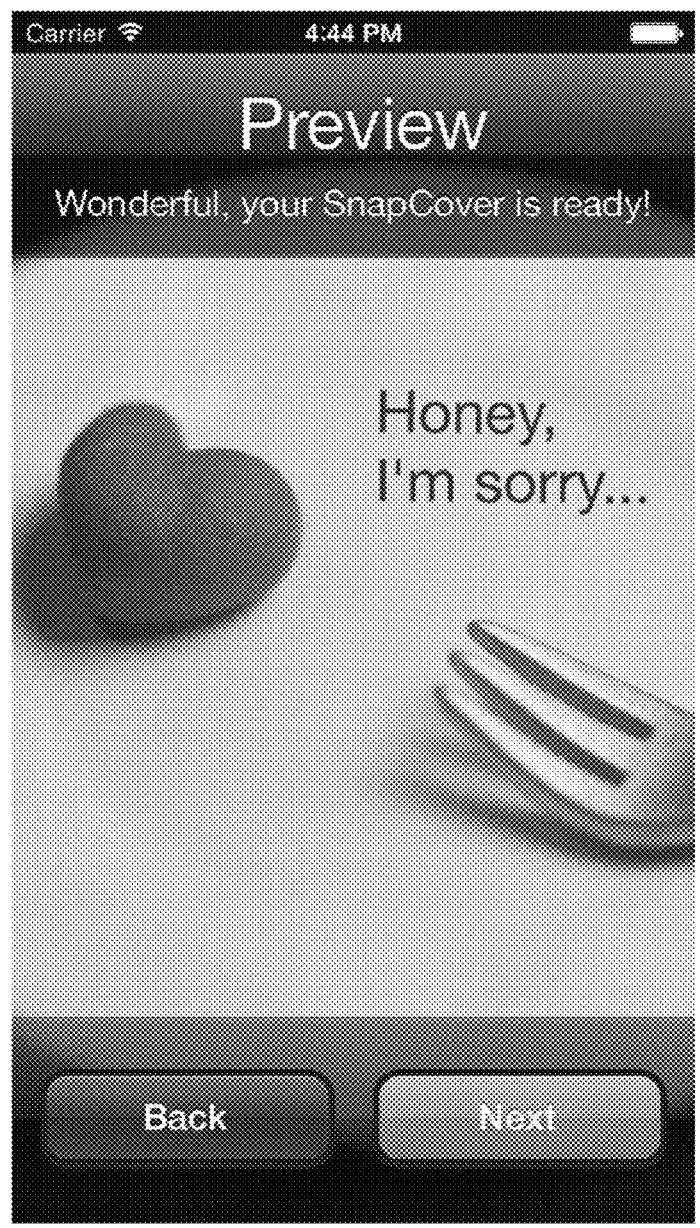
FIG. 4D depicts an exemplary interface for previewing a new portrait file in accordance with various disclosed embodiments.

After the portrait file is created, the CAS can optionally provide a preview of the portrait file. FIG. 4D depicts an exemplary interface for previewing a portrait file in accordance with various disclosed embodiments. Optionally, after processing the portrait file, the portrait file can be stored on the caller device.

Referring to FIG. 3, in Step 302, the caller device generates a distribution policy corresponding to the portrait file. In various embodiments, the distribution policy can include a distribution list including phone number(s) corresponding to contact(s) that are authorized to subsequently download the portrait file. The distribution policy can further include information used for identifying the caller device and the portrait file in subsequent steps, e.g., the phone number of the caller device.

As used herein, a contact can be any callee that the user potentially may call from the caller device. A contact in the distribution list of the user can be referred to as a friend of the user. The distribution list can be referred to as a friend circle correlated with the portrait file.

Depending on various configurations of actual address books, contacts and phone numbers may have various corresponding relationships, which does not limit the implementation of the disclosed methods. In one example, one phone number can correspond to one contact. The user of the caller device can select the phone number of the contact to authorize the device corresponding to the phone number to subsequently download the portrait file. In another example, multiple phone numbers can correspond to one contact and, accordingly, multiple devices can correspond to the contact. The user of the caller device can select a desired phone number of the contact, and the device corresponding to the desired phone number is thus authorized to subsequently download the portrait file.

Figure 5A:
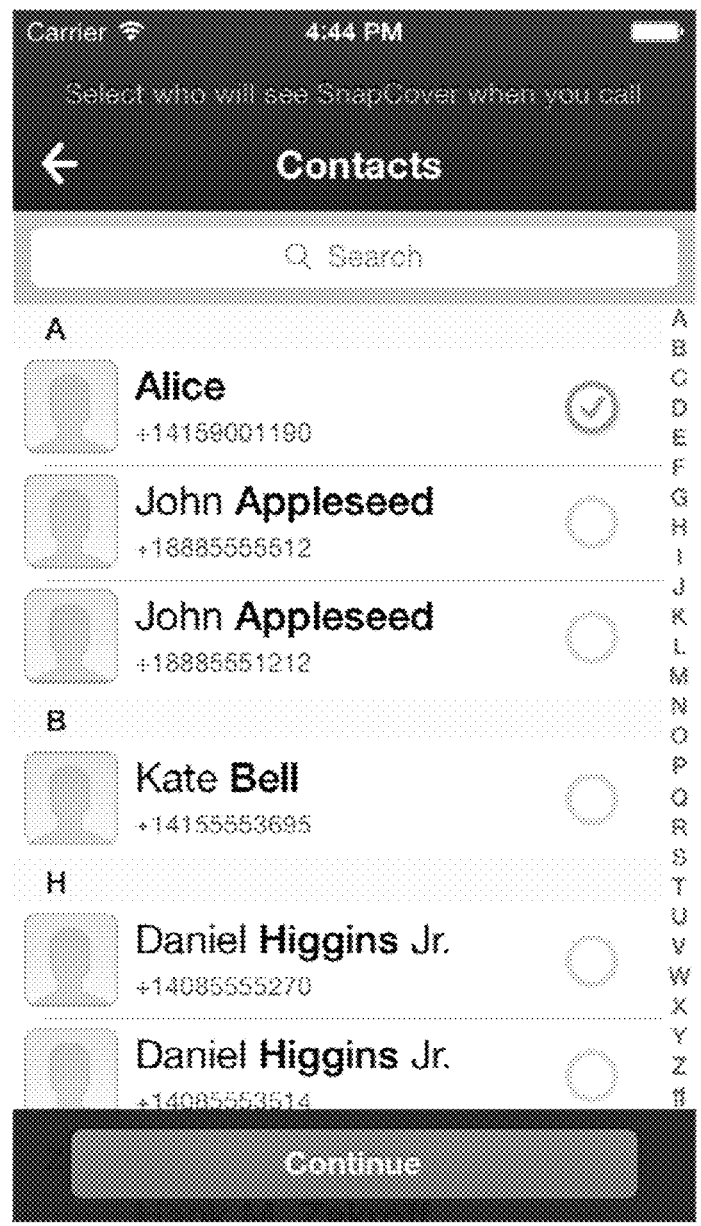
FIG. 5A depicts an exemplary interface for selecting contacts in an address book in accordance with various disclosed embodiments.

After the portrait file is created, the user of the caller device can input information via the CAS to set the distribution policy. In one embodiment, the user can generate a distribution list by selecting contacts from an address book on the caller device. The CAS can display the address book on the caller device such that the user can select the desired contacts. For example, FIG. 5A depicts an exemplary interface for selecting contacts in an address book in accordance with various disclosed embodiments. For illustrative purposes, a contact named 'Alice' is selected as shown in FIG. 5A.

Figure 5B:
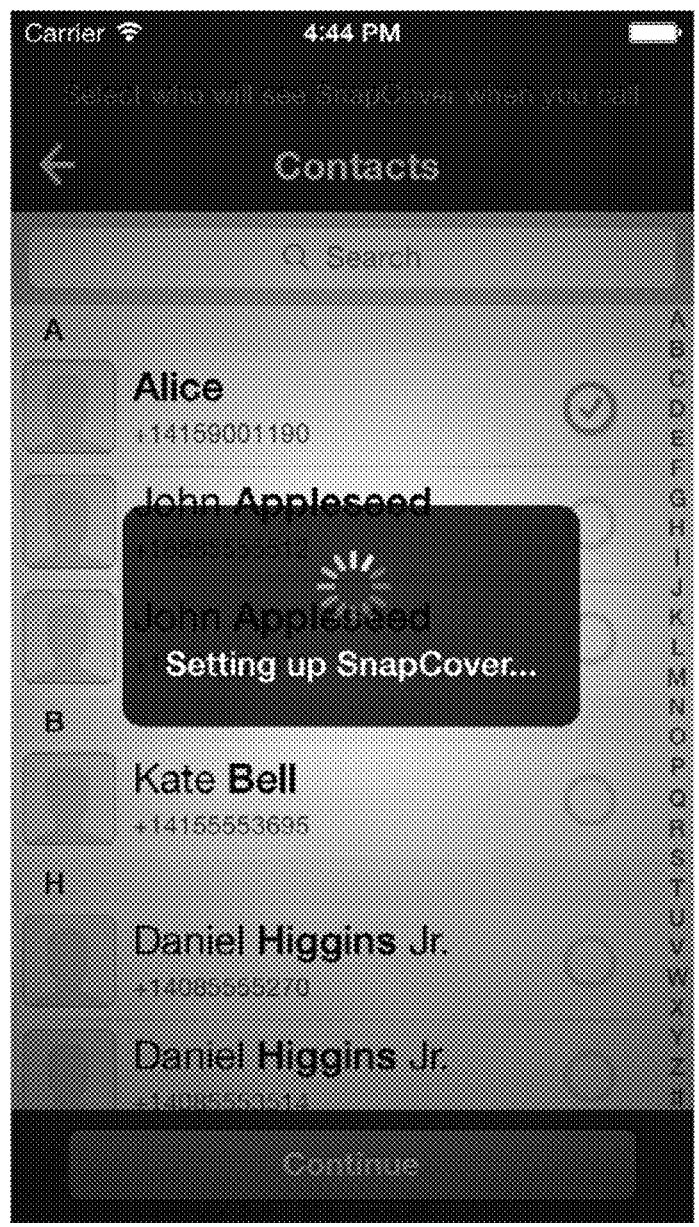
FIG. 5B depicts an exemplary interface after selecting contacts in an address book in accordance with various disclosed embodiments.

The user can select one of, some of, or all of the contacts in the address book. After the desired contacts are selected, phone numbers corresponding to the desired contacts can be stored in the distribution list. FIG. 5B depicts an exemplary interface after selecting contacts in an address book in accordance with various disclosed embodiments. Optionally, the interface as shown in FIG. 5B can be displayed on the caller device during a waiting time after the desired contacts are selected and saved.

Figure 5C:
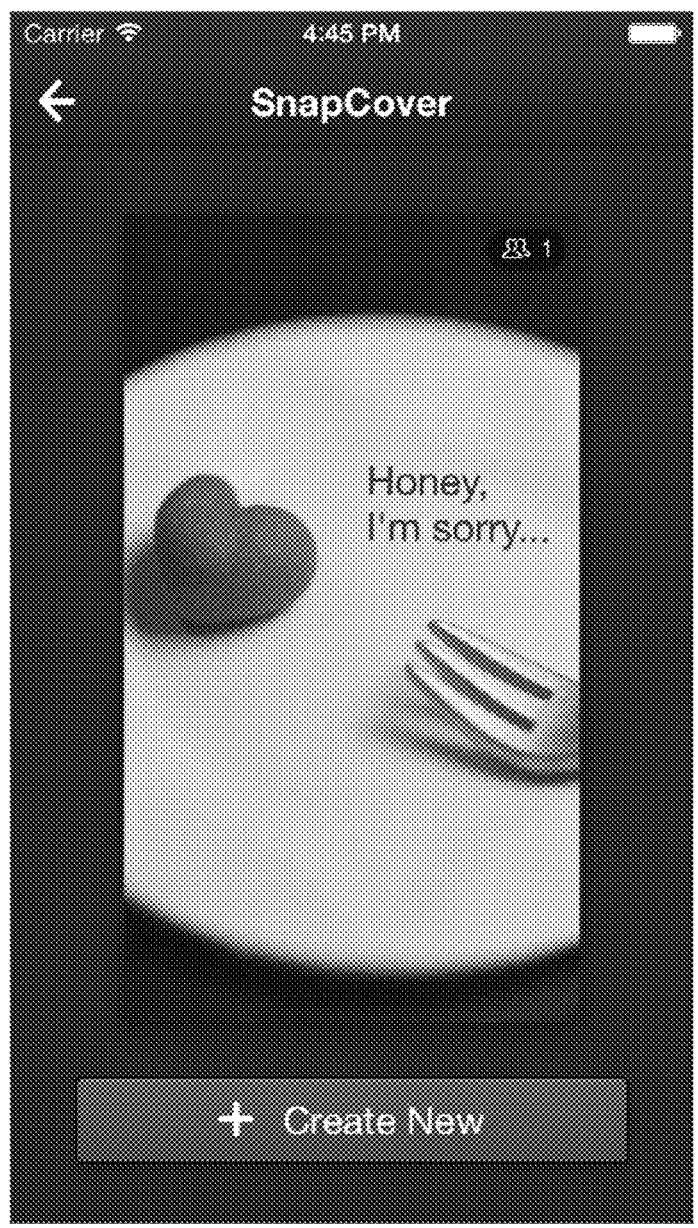
FIG. 5C depicts an exemplary interface after setting up a portrait file in accordance with various disclosed embodiments.

After the portrait file is created and the corresponding distribution policy is generated, the setting up of the portrait file can be completed. FIG. 5C depicts an exemplary interface after setting up a portrait file in accordance with various disclosed embodiments. Optionally, the interface as shown in FIG. 5C can be displayed on the caller device to prompt the user to create another portrait file as desired.

In another embodiment, additionally or alternatively, the user can generate a distribution list by inputting a phone number of a new contact that is not currently in the address book on the caller device. The user can then optionally store the phone number of the new contact in the address book.

Referring to FIG. 3, in Step 303, the caller device sends the portrait file to a portrait distribution system (PDS) on a server. The portrait file can carry or contain the phone number of the caller device. That is, the portrait file and the phone number of the caller device can have a binding relationship. Thus, subsequently, after the portrait file is downloaded to a callee device, the portrait file can be optionally automatically set up in an address book on the callee device to correspond to the phone number of the caller device, i.e., via the phone number of the caller device. And when the caller device subsequently calls the callee device, the portrait file corresponding to the phone number of the caller device can be executed as the caller ID.

The PDS can thus receive and store the portrait file. The portrait file can be stored in any appropriate storage unit, e.g., in PS of a PDS data storage unit. Optionally, the PDS can return to the caller device a first response indicating portrait upload completion.

In Step 304, the caller device sends the distribution policy to a policy control system (PCS) on the server. The PCS can thus receive and store the distribution policy. The portrait file can be stored in any appropriate storage unit, e.g., in PS of a PDS data storage unit. Optionally, the PCS can return to the caller device a second response indicating policy upload completion.

Steps 303-304 can be accomplished via any appropriate IP network. Further, Steps 303-304 can be executed in any suitable sequence. In one example, Steps 303-304 can be executed simultaneously. In another example, Step 304 can be performed, and then Step 303 can be performed. In addition, Step 303 can be performed after Step 301 and before Step 302, and Step 304 is then performed after Step 302. Depending on needs of actual applications, other various sequences of perform Steps 301-304 can also be used to accomplish the functions as disclosed in the present disclosure, without limitation.

In one embodiment, in Step 303, additionally, the PDS can return to the caller device the first response indicating portrait upload completion. Optionally, the first response can include an access instruction corresponding to the portrait file. The access instruction can include location, name, and/or any other appropriate information for a callee device to subsequently locate the portrait file on the PDS and download the portrait from the PDS, without limitation.

The access instruction can include any other appropriate instruction including for locating and downloading the portrait file from the PDS. In one example, the access instruction can include a locator. The locator can include a locator, e.g., uniform resource locator (URL) at which the portrait file is stored. The URL can be generated and assigned for the portrait file by the PDS after receiving and storing the portrait file. The locator can include other type of location information, e.g., path for locating the portrait file in a directory or database maintained by the PDS. In another example, the access instruction can include an access key. The access key can include file name, identification, and/or any string of characters that can be used for forming a URL or a path using preset methods determined beforehand by the application program.

In this case, in Step 304, when the distribution policy is sent to the PCS on the server by the caller device, the caller device can optionally include the access instruction in the distribution policy. That is, the distribution policy can include the distribution list, the phone number of the caller device, and the access instruction. Optionally, the phone number of the caller device can be used by the PCS and PDS for subsequently identifying the caller device. Multiple portrait files can belong to one caller device. Each portrait file can be correlated with a distribution policy, respectively.

Figure 6A:
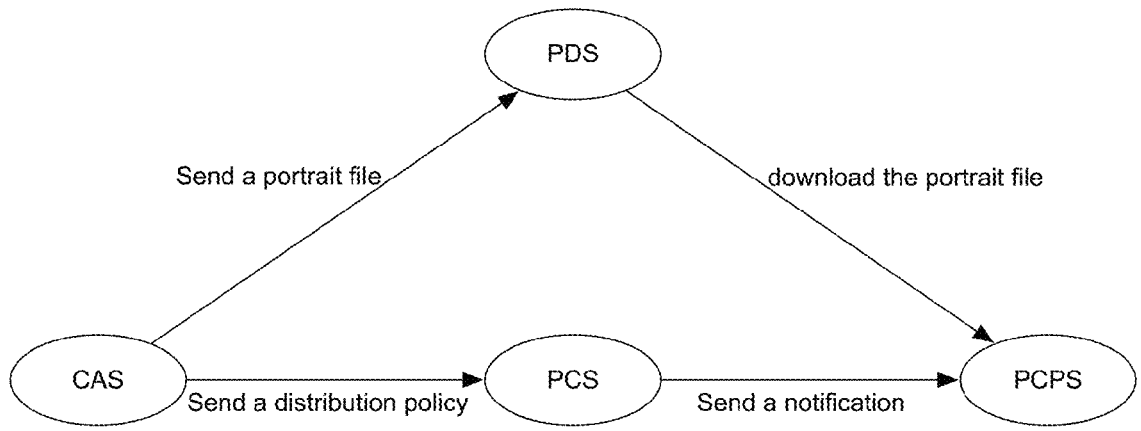
FIG. 6A depicts a network diagram of an exemplary method for providing user ID in accordance with various disclosed embodiments.
Figure 6B:
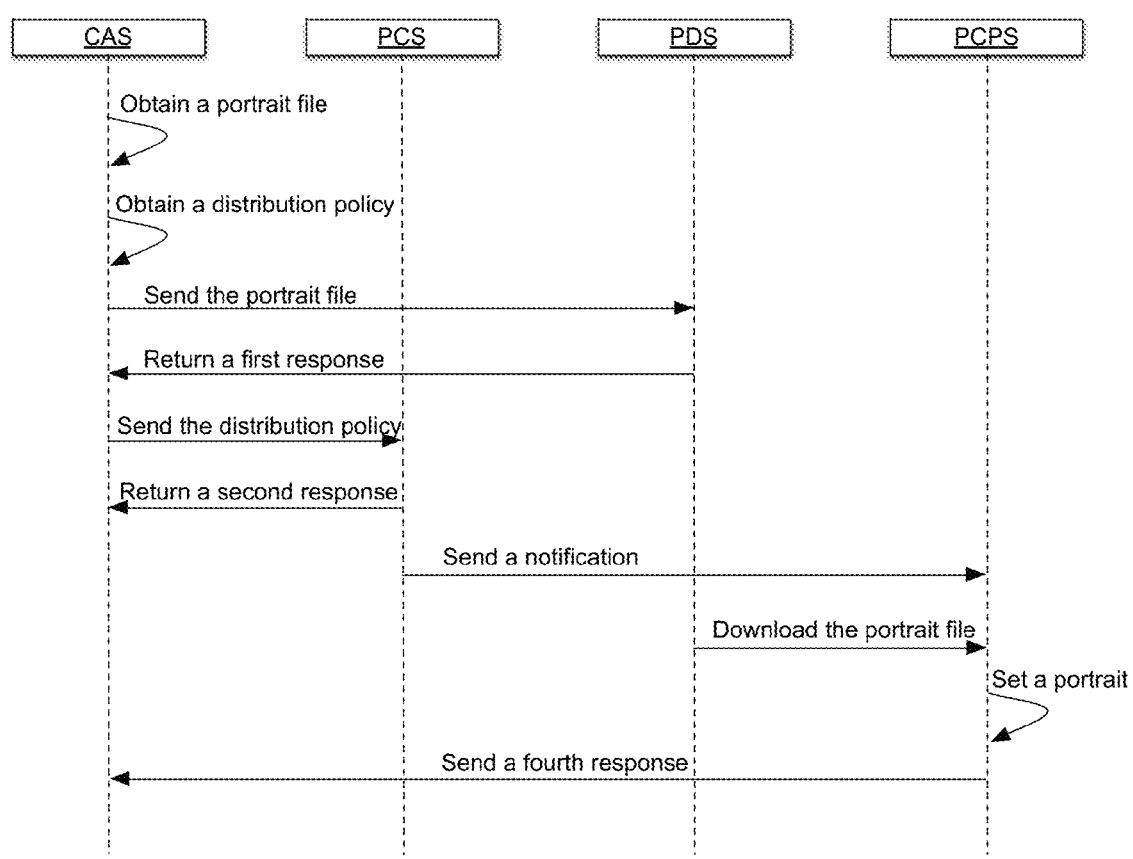
FIG. 6B depicts a timing diagram of the exemplary method in FIG. 6A in accordance with various disclosed embodiments.

For illustrative purposes, FIG. 6A depicts a network diagram of an exemplary method for providing user ID in accordance with various disclosed embodiments, and FIG. 6B depicts a timing diagram of the exemplary method in FIG. 6A in accordance with various disclosed embodiments. The returning of the first response, the returning of the second response, Step 303, and Step 304 can be performed in any appropriate sequence that is the same as or different from the sequence as shown in FIG. 6B, without limitation.

In another embodiment, in Step 303, additionally and optionally, after the caller device sends the portrait file to the PDS, the PDS can return to the caller device a first response indicating portrait upload completion. However, the first response does not include the access instruction. In this case, in Step 303, when the caller device sends the portrait file to the PDS, the portrait file sent to the PDS can optionally carry a unique identifier. Thus, the unique identifier can also be sent to the PDS. The unique identifier can include a unique combination of codes, to be used for uniquely identifying the portrait file subsequently. The PDS can then receive and store the portrait file, generate an access instruction, and correlate the access instruction with the unique identifier. That is, on the PDS, the access instruction of the portrait file can have a mapping relationship with the unique identifier of the portrait file.

Figure 7A:
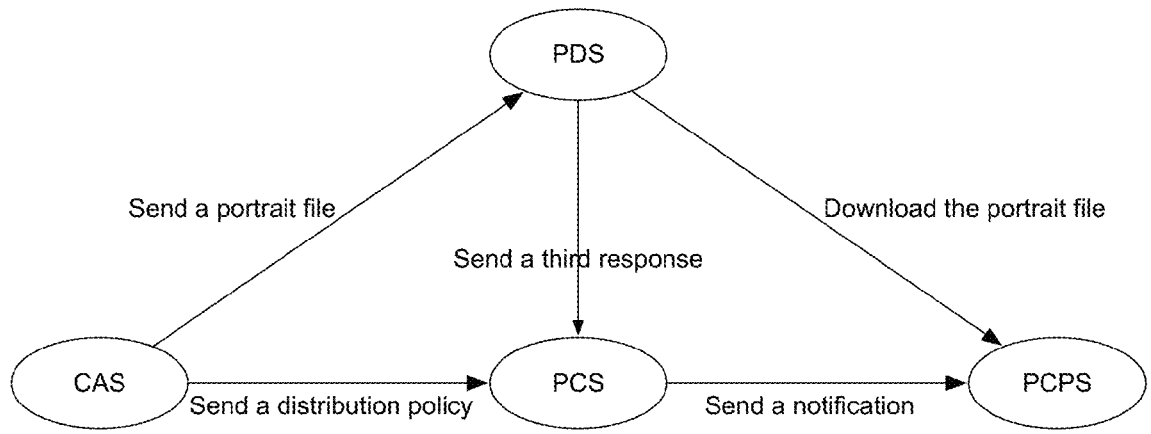
FIG. 7A depicts a network diagram of an exemplary method for providing user ID in accordance with various disclosed embodiments.
Figure 7B:
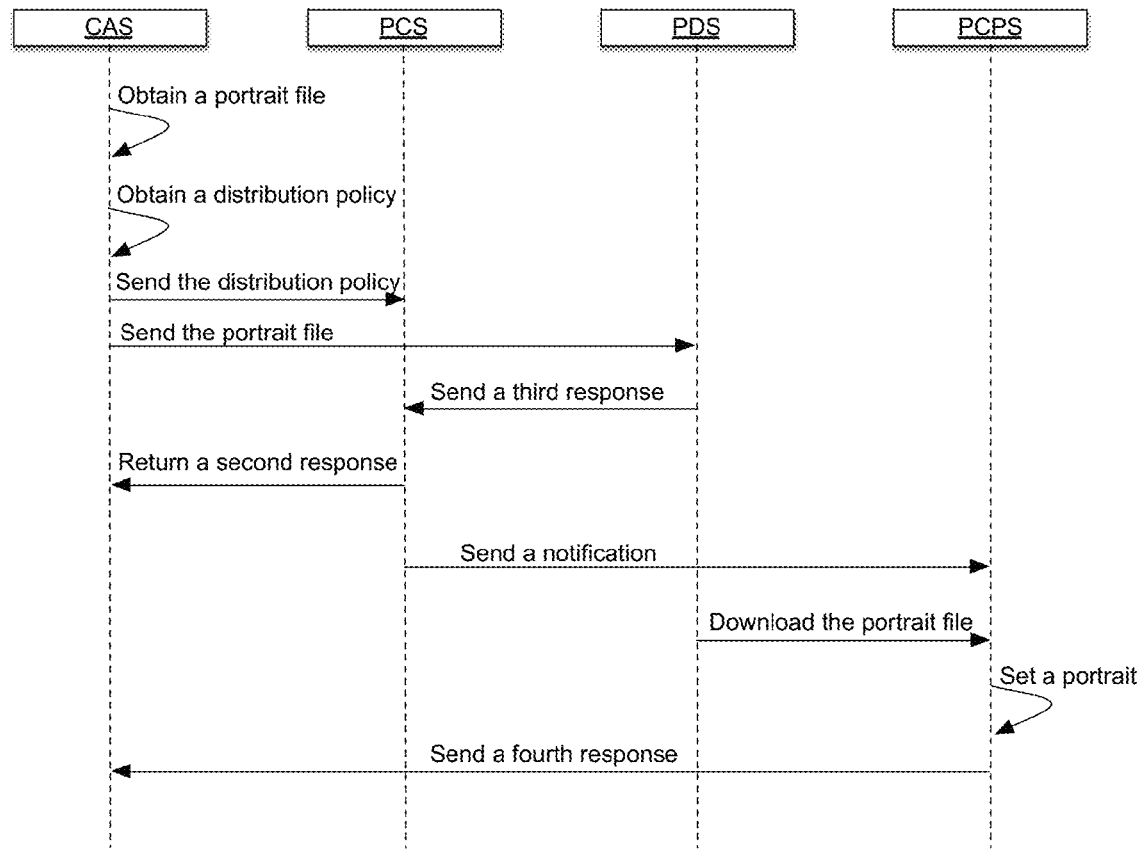
FIG. 7B depicts a timing diagram of the exemplary method in FIG. 7A in accordance with various disclosed embodiments.

In this case, in Step 304, when the distribution policy is sent to the PCS on the server by the caller device, the distribution policy can optionally carry the unique identifier. That is, the distribution policy sent to the PCS can include the distribution list, the phone number of the caller device, and the unique identifier. In other words, the phone number of the caller device, and the unique identifier can also be sent to the PCS. Optionally, the PDS can send to the PCS a third response indicating portrait upload completion. The third response can include the access instruction of the portrait file and the correlated unique identifier. Thus, by using the unique identifier included in the distribution policy, the PCS can obtain the access instruction corresponding to the portrait file from the third response that is received from the PDS. For illustrative purposes, FIG. 7A depicts a network diagram of an exemplary method for providing user ID in accordance with various disclosed embodiments. FIG. 7B depicts a timing diagram of the exemplary method in FIG. 7A in accordance with various disclosed embodiments. The returning of the first response, the returning of the second response, the sending of the third response, Step 303, and Step 304 can be performed in any appropriate sequence that is the same as or different from the sequence as shown in FIG. 7B, without limitation.

Therefore, in various embodiments, the access instruction and the portrait file are uniquely correlated. The PDS can correlate the phone number of the caller device with the portrait file. The PCS can correlate the phone number of the caller device with the distribution policy and the portrait file. Therefore, for a phone number of a caller device, a distribution policy can correspond to a portrait file. Using the above disclosed methods, via a phone number of a caller device, one or more portrait files can be set up, and each of the portrait files can be correlated with a distribution policy, respectively.

Figure 8:
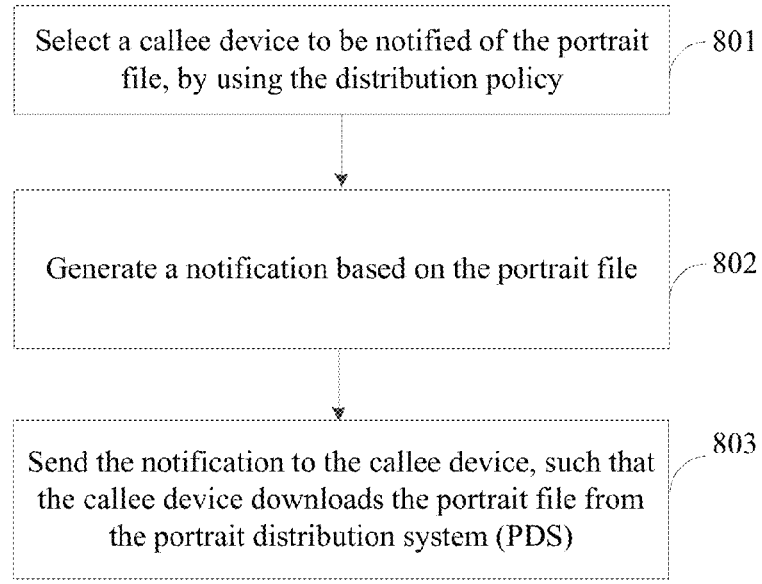
FIG. 8 depicts an exemplary selective distribution process in accordance with various disclosed embodiments.

Referring back to FIG. 3, further in Step 304, after the PCS receives the distribution policy, the PCS can perform a selective distribution process. FIG. 8 depicts an exemplary selective distribution process in accordance with various disclosed embodiments. In Step 801, the PCS selects a callee device to be notified of the portrait file, by using the distribution policy. As used herein, a callee device to be notified of the portrait file can refer to a callee device that is authorized to receive a notification for subsequently downloading the portrait file.

The PCS can use the distribution policy in various ways in order to determine the callee device. In one embodiment, the PCS can determine all the contacts in the distribution list to be callee devices to be notified.

In another embodiment, the PCS can determine certain contacts in the distribution list to be callee devices to be notified. The certain contacts can be determined based on preset criteria. The preset criteria are further detailed in the following examples.

For example, prior to or during the selective distribution process, via a communication network, the PCS can obtain address books uploaded from clients that have an appropriate application program installed. Depending on the configuration and functionality of devices corresponding to the clients, the clients uploading address books can include none of, one of, some of, or all of the contacts in the distribution list sent by the caller device, and can additionally include clients that are not contacts in the distribution list.

The appropriate application program for uploading address books can include the SnapCover program, CAS, PCPS or any appropriate programs that can implement that can accomplish the function of uploading address books from a device. As used herein, unless otherwise specified, an address book uploaded from a device to a server can refer to any appropriate data in the address book or related to the address book, without limitation.

In this case, the PCS can look up the uploaded address books. As used herein, a client that has an address book that includes the phone number of the caller device of the user can be referred to as a follower of user. Thus, in this case, when a contact in the distribution list is also a follower of the user, the PCS can determine the device corresponding to the phone number of the contact is the callee device to be notified. When a contact in the user's distribution list is not a follower of the user, the PCS can determine a device corresponding to the phone number of the contact is not the callee device to be notified.

Figure 9:
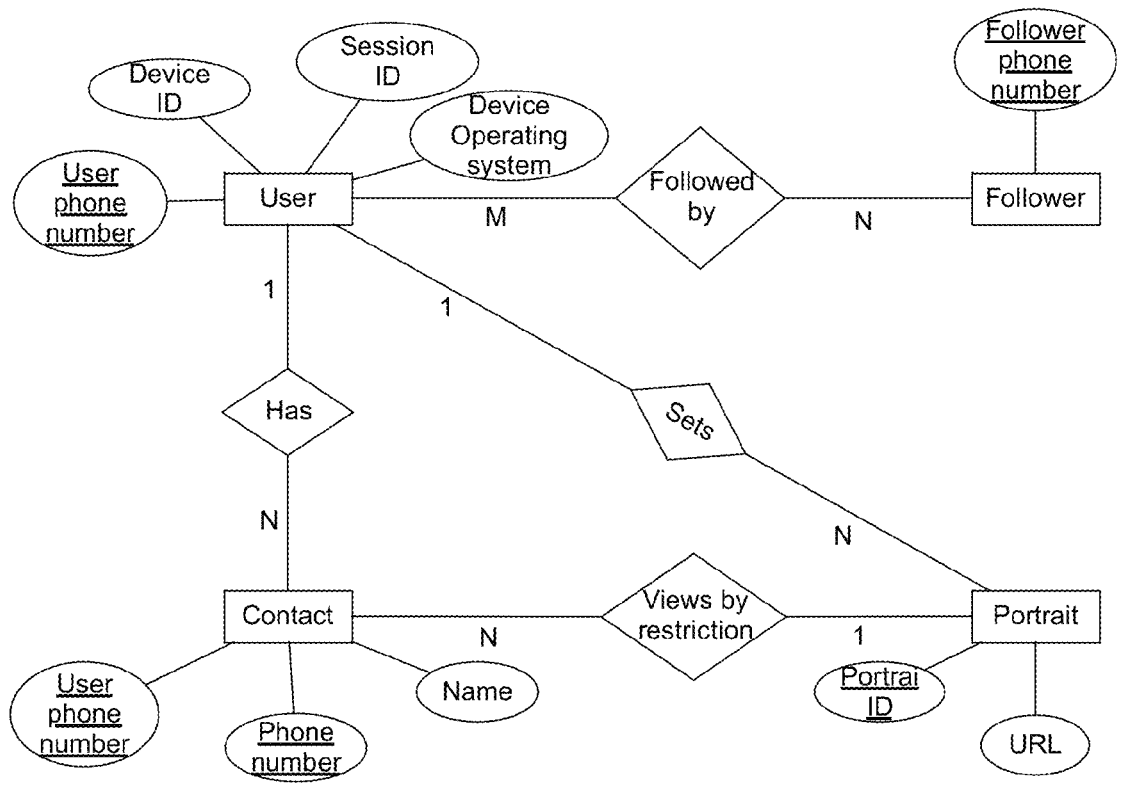
FIG. 9 depicts an entity-relationship diagram of an exemplary data storage structure on PCS and PDS in accordance with various disclosed embodiments.

For illustrative purposes, FIG. 9 depicts an entity-relationship (E-R) diagram of an exemplary data storage structure on PCS in accordance with various disclosed embodiments. The E-R diagram as shown in FIG. 9 can be used to implement the above-disclosed methods that determine callee device according to relationship between the user and follower(s), and the user and contacts.

The E-R diagram in FIG. 9 can be further detailed as follows. A user entity has a phone number as the main key to uniquely identify the user, and can be used as an account number in an account system for implementing the methods as disclosed in various embodiments. Attributes including, e.g., device ID, conversation ID and device operating system can record information of a latest login of the user. Each user can have multiple followers. At the same time, each follower can follow multiple users. Thus, user and follower have a many-to-many relationship. The followers can be stored in a follower list in any appropriate database structure.

A contact entity has a phone number. However, the phone number does not uniquely identify a contact, because a phone number of the contact may be correlated with different names on different devices of users. Thus, to uniquely identify the contact, the contact entity may use a main key combining both the phone number of the user and the phone number of the contact.

A user can set multiple portraits. Each portrait belongs to one user, so user and portrait have a one-to-many relationship. The portrait entity has portrait ID as a unique identifier. URL attribute can record network storage address of the portrait for downloading. Contact and portrait has a limited-viewing relationship, i.e., viewing-by-restriction relationship. The viewing-by-restriction relationship can be specified by the user. The user can specify one or more contacts of his or hers that are authorized to view a portrait. All contacts authorized to view a portrait can form a friend circle. Thus, each friend circle can be correlated with a portrait. The URL in FIG. 9 can be also replaced by other types of access instruction, without limitation.

When a portrait is created or modified, data of the correlated friend circle can be simultaneously modified. When a portrait is modified, a set including phone numbers in the friend circle and a set including phone numbers in the follower list can be used to generate an intersection. The intersection can be used to determine which contacts of the user can a portrait-modification notification or any other appropriate notification can be sent to.

In addition, data of the friend circle can be used to control reading authorization of portrait data. Contacts out of the friend circle cannot download the portrait. In one embodiment, the PCS can subsequently send a notification to PCPS of a callee device. The notification can optionally include authorization information for reading portrait data. Optionally, when a URL is carried in the notification, the authorization information can be included in the URL. When the callee device downloads the portrait data from the PDS, the PDS needs to check the authorization information, in order to accomplish authorization control of portrait data.

Referring back to Step 801 of FIG. 8, in yet another embodiment, the PCS can determine devices corresponding to certain contacts in the distribution list to be callee devices to be notified. The certain contacts can be determined based on preset criteria and social relationships between clients. For example, the distribution policy can optionally include relationship between the user of the caller device and a contact in the distribution list. Optionally, the address books of the contact may be uploaded to PCS beforehand, and may include relationship between the user of the caller device and the client. Additionally and optionally, information of social relationships can also be obtained by linking the accounts of clients on the PCS respectively with the accounts of clients at other social media websites.

In this case, the user can set a preference for a portrait to be sent to a certain group of people. For example, the distribution list can include all of part of the contacts in the address book of the caller device, and the user can additionally specify in the distribution list that only family members need to be notified of a new portrait. The PCS can look up the social relationships between the user and the contacts, and select the contacts in the distribution list who are the user's family members. Devices corresponding to the phone numbers of the family members can thus be determined by the PCS to be callee devices to be notified.

Therefore, in various embodiments, depending on needs of actual application, the distribution policy can include a distribution list, preset criteria determined by the user or the PCS, user preference, or a combination thereof, without limitation.

Referring to FIG. 8, in Step 802, the PCS generates a notification based on the portrait file. The notification can be subsequently sent to the callee device to notify that a portrait is available for downloading or updating. The notification can then be used by the callee device to download the portrait file. The notification can include the phone number of the caller device. The notification can further include information for the callee device to locate and download the portrait file from the PDS.

The notification can include the access instruction on how to locate and download the portrait file. In one embodiment, the notification can include the access instruction, e.g., the URL, of the portrait file. In another embodiment, the notification can include a unique key. The unique key can include the unique identifier (e.g., as described in Step 303). Alternatively, the unique key can include any other suitable codes such as file name or identification. The unique key can be used by the callee device to form the URL or path using preset methods determined beforehand by the application program.

In another embodiment, the notification can include the phone number of the caller device, and does not necessarily include the access instruction or the unique key. In this case, when the callee device subsequently receives the notification, the callee device can use the phone number of the callee device and the phone number of the caller device to retrieve the portrait file from the PDS. The PDS can look up the portrait file or the URL or path of the portrait file in a pre-established database. The database can include any appropriate database established on the PDS for storing portrait files, URLs of portrait files, or paths of portrait files, without limitation.

In yet another embodiment, the notification does not necessarily include the phone number of the caller device, and does not necessarily include the access instruction or the unique key. In this case, when the callee device subsequently receives the notification, the callee device can use the phone number of the callee device to retrieve the portrait file from the PDS. In this case, the PDS needs to maintain a portrait inbox for the callee device. The portrait inbox can include a list of URLs or paths of portrait files corresponding to respective phone numbers of caller devices. The callee device can use its own phone number to access the portrait inbox on the PDS, obtain the URL or path for downloading the portrait file corresponding to the phone number of the caller device, and download the portrait file that has not been downloaded yet.

Referring back to FIG. 8, in Step 803, the PCS sends the notification to the selected callee device, such that the callee device downloads the portrait file from the PDS according to the notification. The callee device can include the callee device(s) to be notified, which can be determined above in accordance with various embodiments, e.g., in Step 801.

In various embodiments, the callee phone can include a PCPS, and the PCPS can be configured to download the portrait file. The PCS can identify the PCPS of the callee device according the phone number of the callee device, and then send the notification to the PCPS of the callee device. The notification can be directly sent to the callee device via any appropriate mobile phone notification system including, e.g., Push Notification of iOS, Google Cloud Messaging of Google (Mountain View, Calif.), Toast Notifications of Microsoft (Redmond, Wash.), etc.

The PCS can send the notification in various ways, without limitation. In one example, the PCS can push the notification to the selected callee device, e.g., as described above. In another example, the notification can be sent via active polling by the callee device. In this case, the callee device can actively check whether the PCS has a notification available for the callee device, and obtain the notification from the PCS when the PCS has a notification available for the callee device. The active polling can be at a certain predetermined frequency or at the request of a user via the callee device, without limitation.

After receiving the notification, the callee device can download the portrait file from the PDS via the PCPS according to the notification, as described above in accordance with various embodiments, e.g., in Step 802. Depending on information carried in the notification the callee device can download the portrait file in various ways, e.g. as described in Step 802.

The PCPS can download the portrait file from the PDS via an IP network, according to, e.g., the URL of the portrait file. The PCPS can download the portrait file from the PDS via Internet application layer protocols based on Transmission Control Protocol (TCP), i.e., TCP/IP, including, but not limited to Hypertext transfer protocol (HTTP), Hypertext Transfer Protocol over Secure Socket Layer (HTTPS), File Transfer Protocol (FTP), Secure File Transfer Protocol (SFTP), Extensible Messaging and Presence Protocol (XMPP), or Real-time Transport Protocol (RTP).

Optionally, the portrait file downloaded by the callee device can carry the phone number of the caller device. In this case, the callee device can identify the caller device based on the phone number of the caller device.

The PCPS can optionally send a fourth response to the CAS of the caller device. The fourth response can indicate portrait setup completion.

After the portrait file is downloaded to the callee phone via the PCPS, the portrait file can be subsequently processed by the PCPS in various ways. In one embodiment, the PCPS can automatically and directly modify the address book on the callee device. For example, the PCPS can look up an entry in the address book that corresponds to the phone number of the caller device. When the address book includes the entry that corresponds to the phone number of the caller device (e.g., when the callee device is a follower of the caller device or the user of the caller device), the PCPS can find the entry and modify portrait of the entry with the downloaded portrait file.

In this case, optionally, the user of the callee device can permit the PCPS to access and operate the address book on the callee device. For example, when the callee device is a smart phone using an iOS operating system, the callee device can have a function unit called Contacts. Contacts can be configured to implement the address book on the callee device. The Contacts may provide an application programming interface (API) to interact with other software components. The API can enable other software components to perform certain functions on the address book including, but not limited to, adding, deleting, modifying, inquiring entries in the address book.

Thus, via the API, the PCPS can look up an entry in the address book that corresponds to the phone number of the caller device, find the entry when the entry is included in the address book, and modify portrait of the entry with the downloaded portrait file. Optionally, the PCPS can be permitted by the callee device to add entries. In this case, when the entry is not previously included in the address book, the PCPS can automatically add a new entry, i.e., a new contact correlated with the phone number of the caller device, and use the corresponding portrait file as the portrait of the new contact.

In another embodiment, the downloaded portrait file can be automatically saved in any appropriate database on the callee device, and the database can be managed by the PCPS. The downloaded portrait file can be assigned an appropriate storage address. The PCPS can set a caller ID corresponding to the caller device by intercepting an incoming call. In this case, the PCPS can control an interface displayed on the callee device when the caller device calls the callee device. In various embodiments, the intercepting of the incoming call can be automatically implemented on the callee device via the PCPS.

Referring back to FIG. 3, in Step 305, optionally, the caller device calls the callee device, to cause the callee device to execute the portrait file as the caller ID. Executing a portrait file can refer to any appropriate showing of content of the portrait file, including, e.g., displaying the portrait file when the portrait file includes text, image, animation, playing the portrait file when the portrait file includes audio or video, or any other operations to execute a multi-media file.

Figure 11:
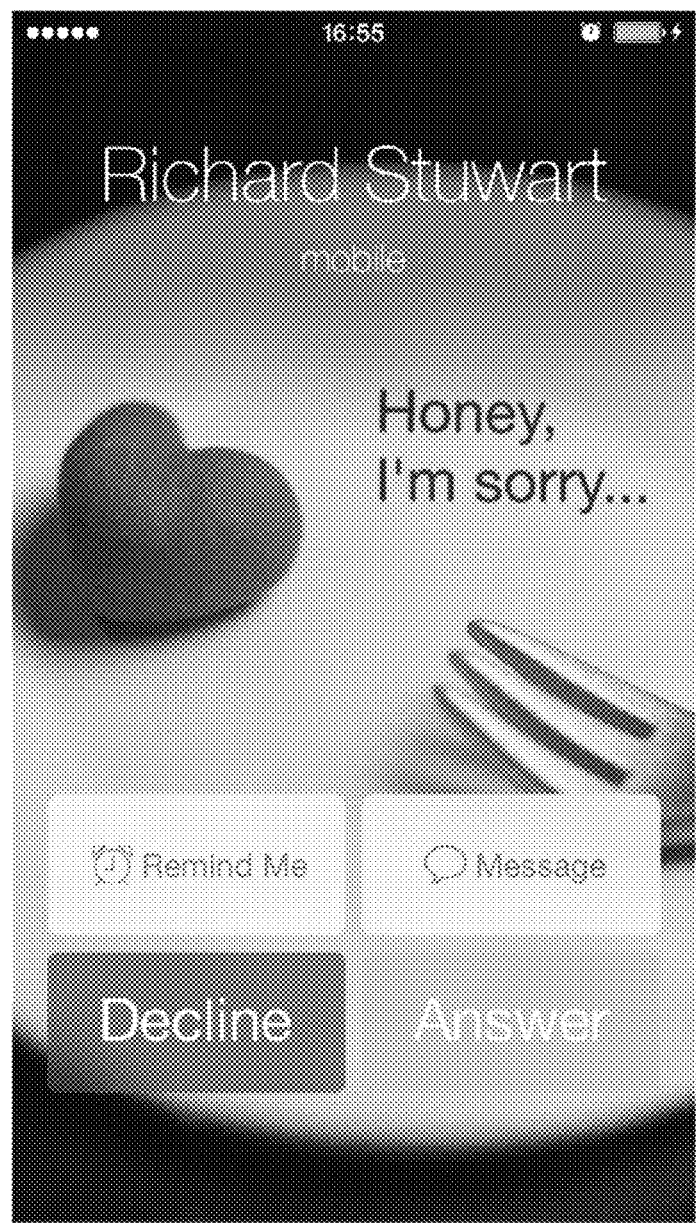
FIG. 11 depicts an exemplary interface of displaying a caller ID during a ringing prompt in accordance with various disclosed embodiments.

Thus, when the caller device places an outgoing call to the callee device, during a ringing prompt of the corresponding incoming call on the callee device, the portrait file can be executed on the callee device to represent the caller device or the user of the caller device. For example, FIG. 11 depicts an exemplary interface of displaying a caller ID during a ringing prompt in accordance with various disclosed embodiments. Optionally and additionally, name of the caller, phone number corresponding to the caller device, and/or type of phone number (e.g., mobile, office or home phone) can be displayed along with the portrait file, i.e., can be included in the caller ID for further identifying the caller device.

As described in various embodiments (e.g., in Step 803), after the portrait file is downloaded to the callee device via the PCPS, the portrait file can be subsequently processed by the PCPS in various ways. Depending on how the portrait file is processed by the PCPS previously, the caller ID can be provided on the callee device during the ringing prompt in various ways.

In one embodiment, after the portrait file is downloaded as shown in Step 803, the PCPS directly modifies the address book on the callee device, such that the portrait is set up on the callee device. The PCPS can look up an entry in the address book that corresponds to the caller device, find the entry, modify portrait of the entry with the downloaded portrait file, and store the portrait in the address book. In this case, the portrait file can include an image, a text, and/or an animation that can be used as an appropriate portrait in the address book.

In this case, when the callee device receives the incoming call from the caller device, the portrait of the caller device stored in the address book can be displayed during the ringing prompt as the caller ID. An interface displayed on the callee device during the ringing prompt can be any appropriate interface used by the callee device during a ringing prompt, and the stored portrait can be displayed on the interface. For example, when the callee device is a smart phone using an iOS operating system, the callee device can have a function unit called Phone. The Phone is configured to implement a mobile phone function on the callee device. When the caller device calls the callee device, the Phone can look up, in the address book, information including name and portrait corresponding to the phone number of the caller device, so the portrait can be displayed during the ringing prompt.

In another embodiment, after the portrait file is downloaded as shown in Step 803, the PCPS can set portrait as the caller ID corresponding to the caller device by intercepting an incoming call on the callee device. In this case, the PCPS can control an interface displayed on the callee device during a ringing prompt, such that the portrait file can be played on the interface.

Figure 12:
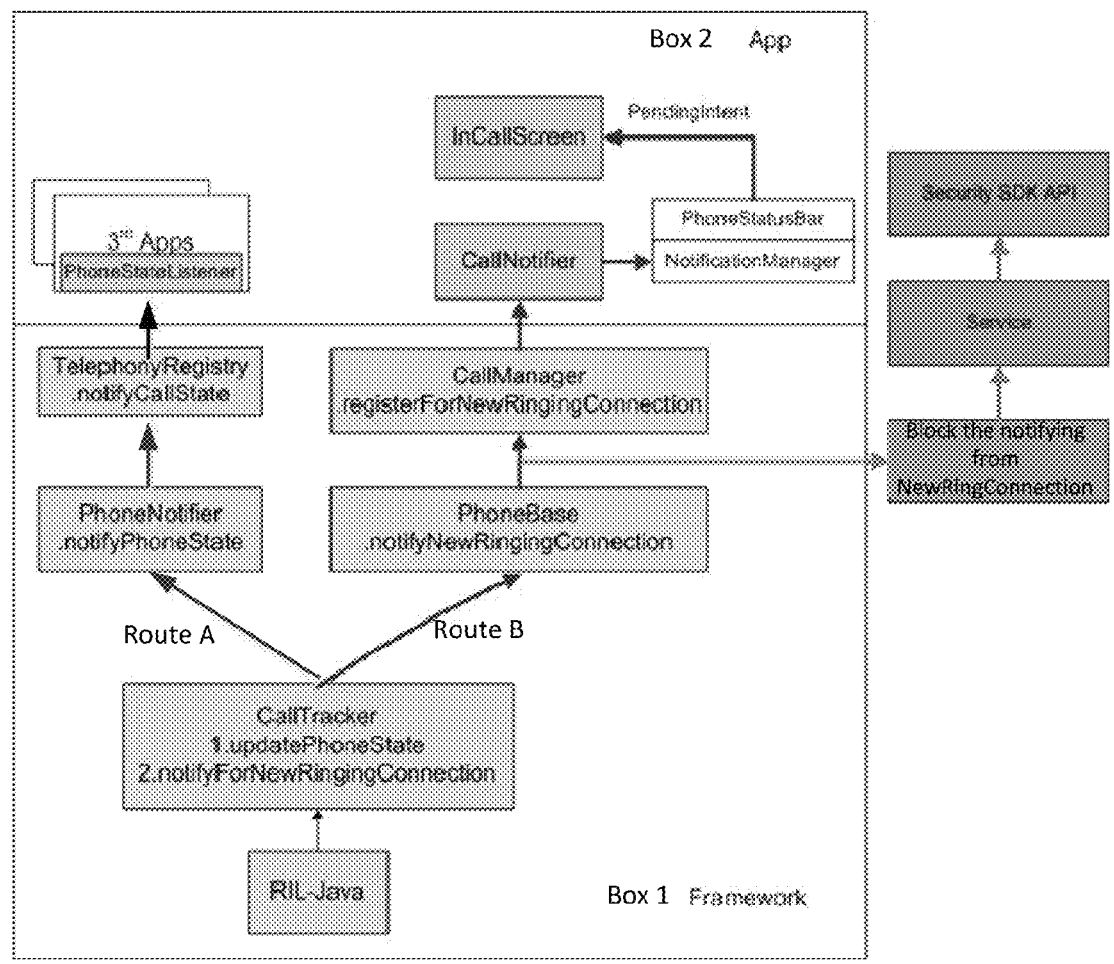
FIG. 12 depicts an exemplary system structure diagram incorporating a function of intercepting an incoming call in accordance with various disclosed embodiments.

The PCPS can intercept an incoming call on the callee device using any appropriate software and/or hardware configuration on the callee device. For illustrative purposes, FIG. 12 depicts an exemplary system structure diagram incorporating a function of intercepting an incoming call in accordance with various disclosed embodiments. For example, the system can be implemented on a callee device using Android operating system. As shown in FIG. 12, Box 1 is an App layer. Box 2 is a framework layer. When an incoming call is placed, a Radio Interface Layer (RIL) layer (as shown in Box 2) can report the corresponding incoming call event to a CallTracker, the incoming call event can then be processed via two routes including Route A and Route B.

During Route A, a message of 'PHONE_STATE_CHANGED' can be delivered sequentially via PhoneNotifier and TelephonyRegistry. A third-party application program (e.g., $3^{rd}$ Apps as shown in FIG. 12) can register a listener (e.g., PhoneStateListener as shown in FIG. 12) via software development kit (SDK) API. The listener can be configured to monitor the message of 'PHONE_STATE_CHANGED' sent by the TelephonyRegistry of the framework layer. When the message of 'PHONE_STATE_CHANGED' indicates a call state changes from CALL_STATE_IDLE CALL_STATE_RINGING, the message thus indicates there is an incoming call. The message can carry the phone number of the incoming call, e.g., as an 'intent'.

During Route B, a message of NewRingingConnection can be delivered from the framework layer to the App layer sequentially via PhoneBase, CallManager, CallNotifier and InCallScreen. To intercept an incoming call, hooking technique can be used in the PhoneBase, such that an appropriate program (e.g., certain mobile phone security software having call-intercept function, herein referred to as Service as shown in FIG. 12) on the callee device can be notified of the incoming call, and block the delivery of the message of NewRingingConnection from the PhoneBase to the CallManager. Root access can be provided to the Service, such that the Service can wait for request from a client (e.g., client B of callee device). The Service can further expose appropriate SDK API (e.g., Security SDK API as shown to FIG. 12) to the client. The API can include the phone call of the incoming call. Thus, according to the phone number provided by the API, and via the PCPS, the callee device can play the portrait file, e.g., display the portrait.

Figure 10:
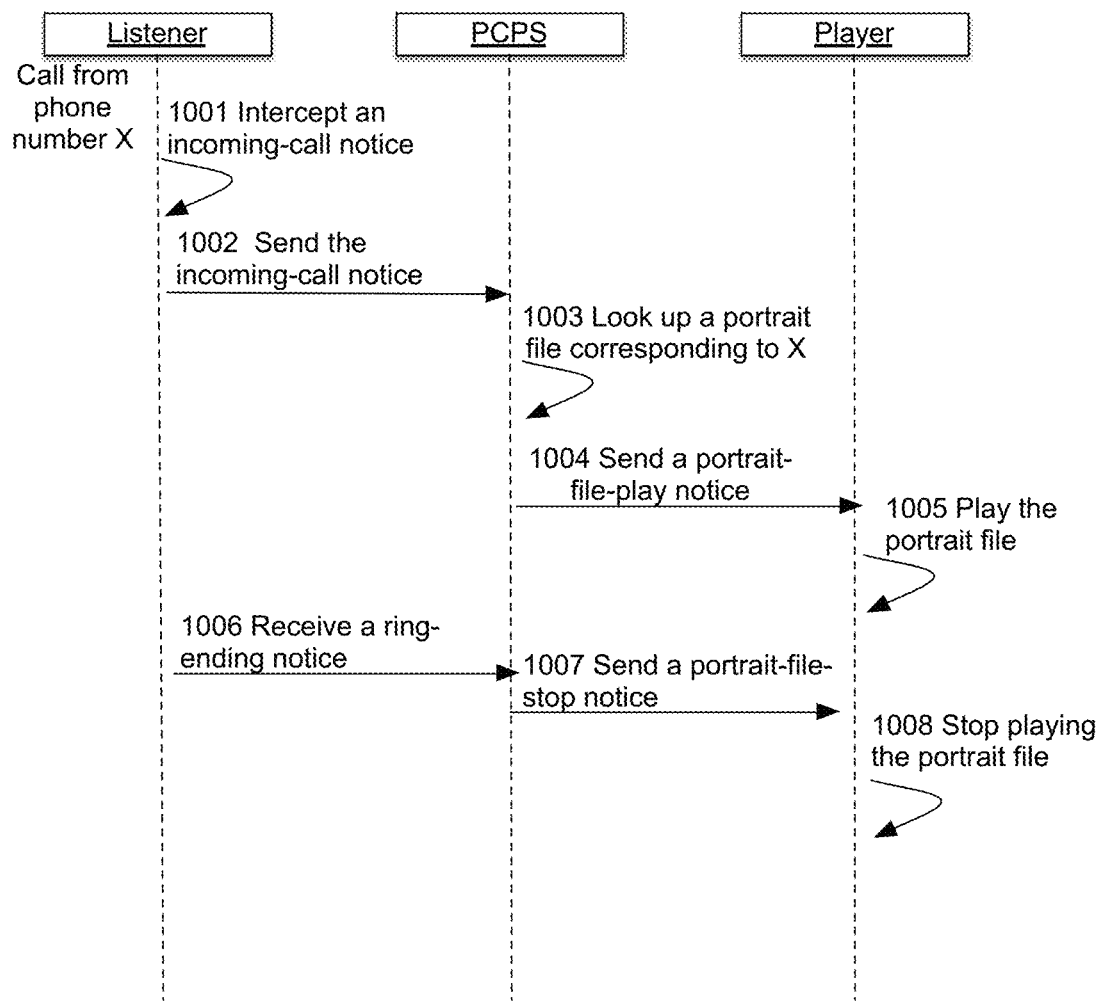
FIG. 10 depicts an exemplary timing diagram of intercepting an incoming call in accordance with various disclosed embodiments.

Thus, in this case, when the PCPS provides the caller ID corresponding to the caller device by intercepting an incoming call on the callee device, the callee device can be installed with appropriate program(s) for intercepting incoming calls. For example, the callee device can include a Listener. The Listener can be registered by the PCPS with the PhoneStateListener via SDK API, or with the Service via SDK API, or via any other appropriate methods, without limitation. In addition, the callee device can be installed with an appropriate program for playing the media file. For example, the program can be referred to a Player. The Player can be included in, or independent of the PCPS system, without limitation. For example, FIG. 10 depicts an exemplary timing diagram of intercepting an incoming call in accordance with various disclosed embodiments. The process in FIG. 10 can include the following exemplary steps.

In Step 1001, the Listener intercepts an incoming-call notice associated with the phone number X of the caller device. The incoming-call notice associated with the phone number X of the caller device can be generated by monitoring the call state, and can indicate the callee device is receiving a call from the phone number X. For example, the callee device can launch the Listener to monitor incoming calls. Optionally, before launching the Listener, the user of the callee device can log in the callee device.

In Step 1002, the Listener sends to the PCPS the incoming-call notice associated with the phone number X. In Step 1003, the PCPS can look up the storage address of the portrait file corresponding to the phone number X. The storage address can thus be obtained.

In Step 1004, the PCPS sends a portrait-file-play notice to the Player. The portrait-file-play notice can include the storage address of the portrait file. The portrait-file-play notice can be used to instruct the Player to play the portrait file.

In Step 1005, according to the storage address of the portrait file included in the portrait-file-play notice, the Player starts to play the portrait file. The starting of the playing by the Player can be the starting of the ringing prompt. In various embodiments, the Player can play the portrait file, in a loop, i.e., repeatedly, during the ringing prompt.

In Step 1006, when the Listener receives a ring-ending notice, the Listener sends the ring-ending notice to the PCPS. The Listener can receive the ring-ending notice when the caller device stops calling the callee device (e.g., hangs up, or disconnected for any other reasons) before the callee device answers the call, or when the callee device starts to answer the call.

In Step 1007, the PCPS sends a portrait-file-stop notice to the Player. In Step 1008, according to the portrait-file-stop notice, the Player stops playing the portrait file. Thus, the playing or displaying of the caller ID is completed.

Optionally, an account system can be established to uniquely identify caller devices and/or callee devices via respective phone numbers thereof. The account system can be used by the PCS and/or PDS for correlating the caller device, the callee device, the portrait file, unique identifier of the portrait file, distribution policy, portrait inbox, storage space, and any appropriate database for achieving the functions as disclosed in various embodiments. For example, the account of a user of a device can be associated with the phone number of the device, and the device can refer to a caller device or a callee device. The user can log in the account system via the device by performing a login process.

Figure 13A:
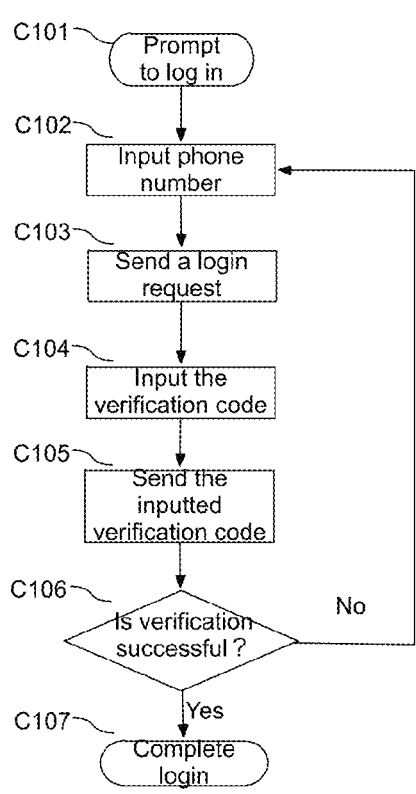
FIG. 13A depicts an exemplary client-side login process in accordance with various disclosed embodiments.
Figure 13B:
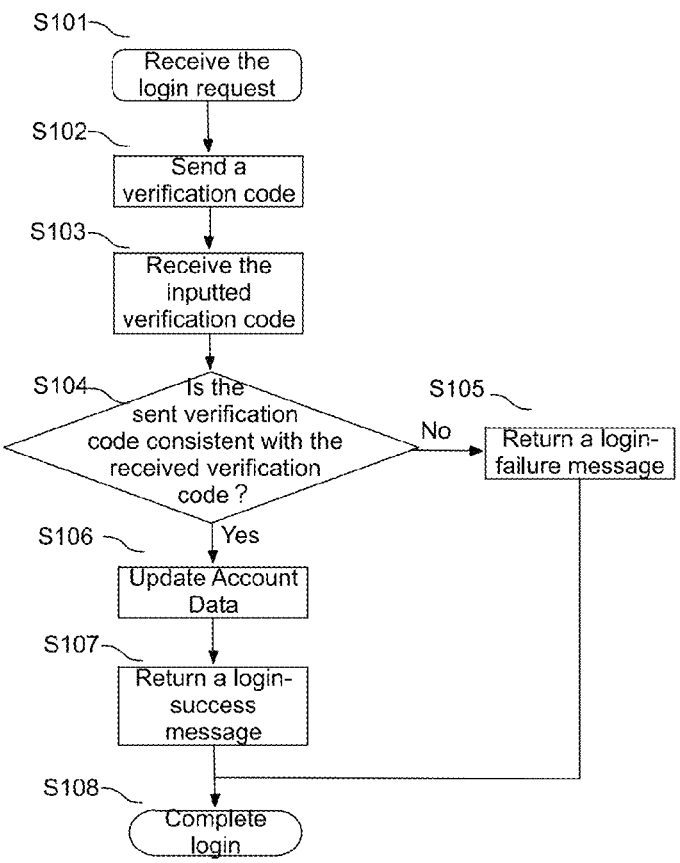
FIG. 13B depicts an exemplary server-side login process in accordance with various disclosed embodiments.

For illustrative purposes, FIG. 13A depicts an exemplary client-side login process in accordance with various disclosed embodiments. The client-side login process can be performed on a caller device or callee device. FIG. 13B depicts an exemplary server-side login process in accordance with various disclosed embodiments. The server-side login process can be performed on a server that implements the PCS and/or the PDS. In practice, a login process can include performing, in an appropriate sequence, the steps in both of the client-side login process (as shown in FIG. 13A) and the server-side login process (as shown in FIG. 13B).

For example, referring to FIG. 13A, in Step C101, a login interface is displayed on a device to prompt a user of the device to log in an application program. The application program can include any appropriate program that can implement the methods as disclosed in various embodiments. For example, the program can be referred to as SnapCover.

Figure 13C:
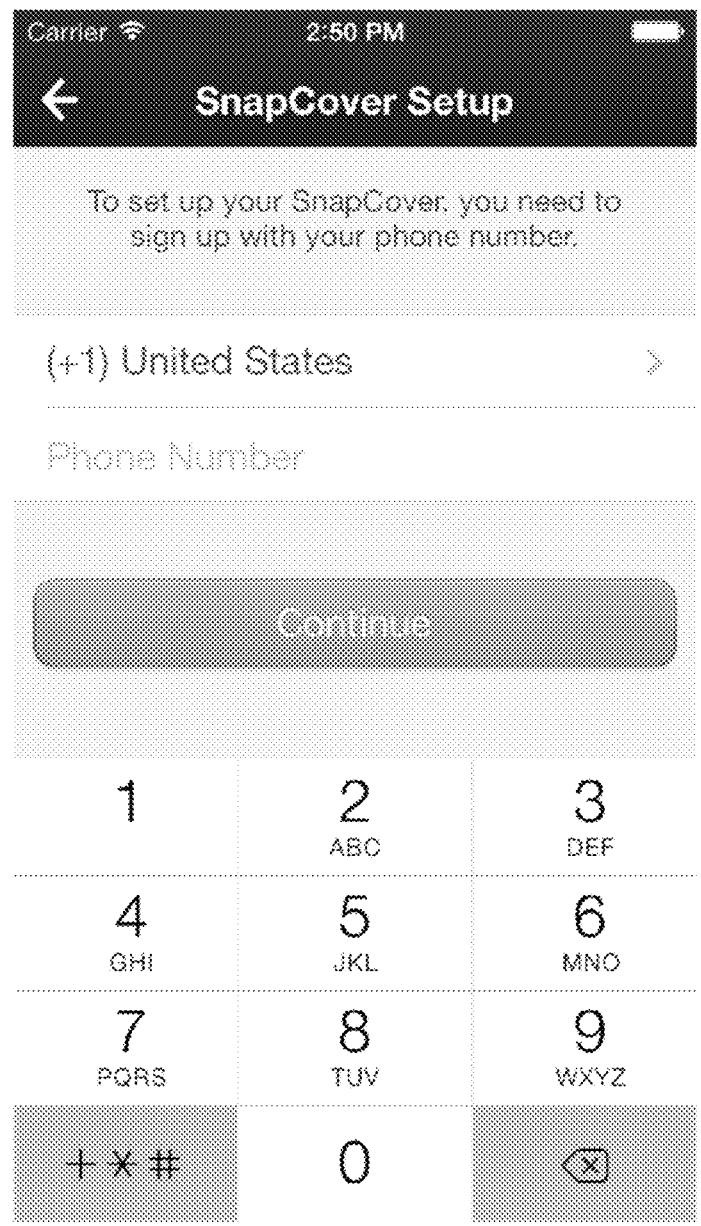
FIG. 13C depicts an exemplary interface of inputting a phone number in accordance with various disclosed embodiments.

In Step C102, the user inputs the phone number of the device. The user can input the phone number via a certain interface prompting the user to enter the phone number. The interface can include, e.g., a soft keyboard. For example, FIG. 13C depicts an exemplary interface of inputting phone number in accordance with various disclosed embodiments.

In Step C103, the user sends a login request to the server. For example, after inputting the phone number, the user can send a login request to the server by clicking a 'continue' button (e.g., as shown in FIG. 13C).

Referring to FIG. 13B, in Step S101, the server receives the login request. In Step S102, the server sends a verification code to the device via the phone number.

Figure 13D:
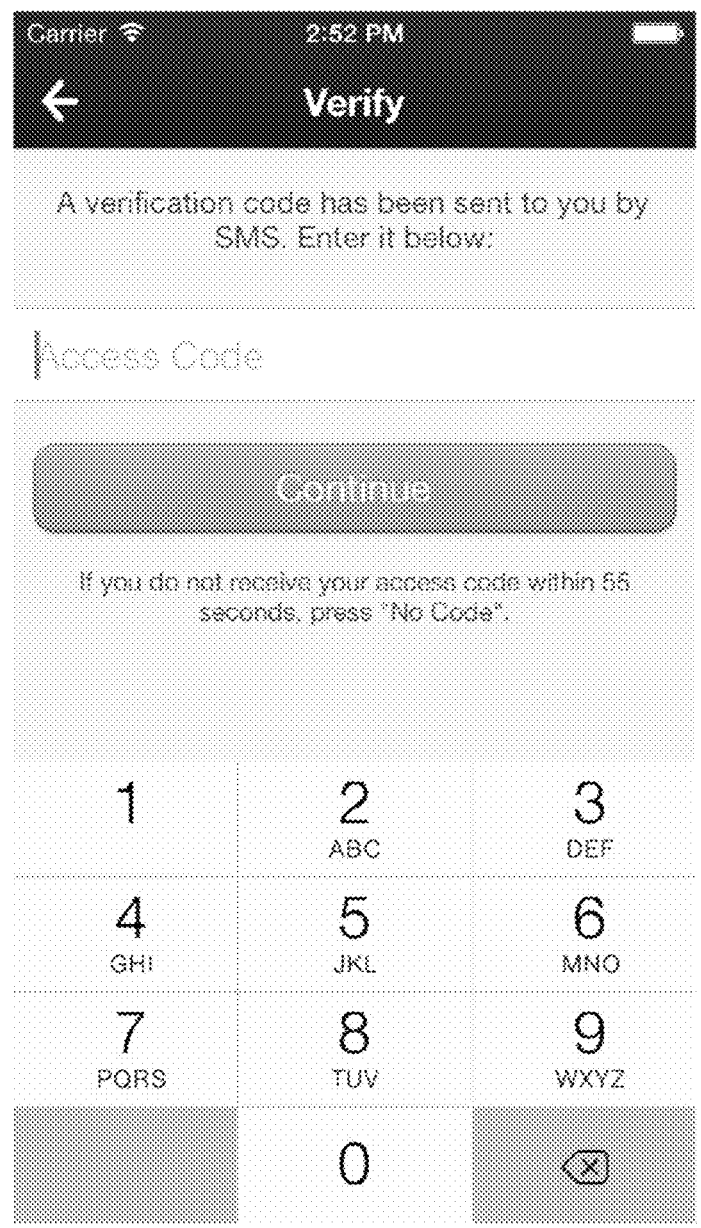
FIG. 13D depicts an exemplary interface of inputting a verification code in accordance with various disclosed embodiments.

Referring to FIG. 13A, in Step C104, the user receives the verification code via the device, and inputs the verification code on the device. For example, the device can receive the verification code using any appropriate communication methods including, but not limited to, email, messaging, phone calling, etc. FIG. 13D depicts an exemplary interface of inputting a verification code in accordance with various disclosed embodiments. In Step C105, the device sends the inputted verification code to the server.

Referring to FIG. 13B, in Step S103, the server receives the verification code inputted by the user. In Step S104, the server compares the received verification code with the verification code sent previously (e.g., in Step S102).

In Step S105, when the received verification code is inconsistent with or different from the verification code sent previously, the server returns a login-failure message to the device. In Step S106, when the received verification code is consistent with or the same as the verification code sent previously, the server can optionally update account data of the user in the account system. In addition, in Step S107, the server returns a login-success message to the device, and the login process is completed (as shown in Step S108).

Referring to FIG. 13A, in Step C106, the device receives the login-failure message or the login-success message from the server. When the device receives the login-failure message, the user can re-try the login process. In Step C107, when the device receives the login-success message, the login process is completed.

In addition to the login process described above (e.g., as shown in FIGS. 12A-12B), various other login processes can be used. For example, a device can first communicate with a server to generate and agree on a verification code A. Next, the device can display the verification code A to the user and the user input and send a verification code B to the server, e.g., via email, messaging or any other appropriate methods. In this case, the user needs to ensure the verification code B is consistent with the verification code A. Then, the server can determine whether the verification code B is consistent with the verification code A. When the verification code B is consistent with the verification code A, the login process is successful.

Optionally, after the login process is successful and completed, the user can upload an address book from the device to the server. The address book can be stored on the PCS of the server, e.g., stored on the PS of the PCS.

Thus, in various disclosed embodiments, a caller device can create a portrait file to be used as a caller ID representing the caller device. A distribution policy corresponding to the portrait file can be generated. The portrait file can be sent to the PDS, and the distribution policy can be sent to the PCS. The PCS can perform a selective distribution process. Thus, a callee device selected by the PCS in the selective distribution process can download the portrait file from the PDS. When the caller device calls the callee device, the portrait file can be played, executed, or displayed as caller ID representing the caller device or user of the caller device.

By using the disclosed methods, a caller is enabled to conveniently present his or her desired portrait to a callee. A caller can set multiple portrait files as his/her caller ID on other user's devices. Each portrait file can be shared with one or more contacts that the caller selects. Optionally, the PCS can apply further policy, criteria, or algorithm to further select the contacts and determine callee devices that can receive a portrait file. Thus, the caller can have different portraits and selectively use the different portraits simultaneously as caller IDs for various social relationships or communication purposes.

For example, the device can be a mobile phone. A caller may simultaneously use the same mobile phone for professional or business contacts, family members, and friends. The user may prefer to be represented by a professional-style portrait when he calls his professional contacts, and by a casual or funny portrait when he calls his close friends or family members.

In one example, the user previously had an argument with his spouse. His spouse is unwilling to answer his phone call. However, the user may create his portrait including a picture with a personal message, or a funny picture to amuse his spouse, and, in this way, his spouse is more likely to answer the phone call. He can thus convey his message via the caller ID (e.g., as shown in FIG. 11). At the same time, the user can still have a professional-style portrait as his caller ID shown in the address books of his professional contacts, and displayed when he calls his professional contacts. Selective distribution of caller ID can thus be accomplished. Thus, caller ID can be utilized to convey information between caller and callee, and communication efficiency can be further improved.

In addition, in various embodiments, portraits for entries in an address book can be automatically updated without being manually inputted by a user of a callee device. Thus, users can have an updated address book with caller IDs customized by the contacts in the address book, and the entries can be created without the user spending time and efforts.

In certain Voice over Internet Protocol (VoIP) technologies, a portrait can be set up by a caller, and thus a callee does not have to set up portraits for callers manually in an address book. However, to use VoIP, a callee has to use a smart phone, because current feature phones usually are not enabled for VoIP. Thus, setting up an address book via VoIP service has significant limitation in users and devices.

Using the methods in accordance with various disclosed embodiments, users can install an appropriate application program on a device, e.g., a smart phone or a feature phone, in order to accomplish the features of the disclosed methods, and fully utilize the built-in address book on the phone. Therefore, a smart phone is not essential for implementing the disclosed methods. Further, users do not need to install devices with specific software of a specific VoIP service provider to have an address book established. Further, users do not need to have an account and an address book set up with the specific VoIP service provider. Thus, in comparison with VoIP technologies, the disclosed methods can more significantly improve the convenience of managing an address book and can be applied to a much wider variety of mobile devices.

When the device is a smart phone, the smart phone can download and use the application program via any appropriate IP network. When the device is a feature phone, the feature phone can also implement the disclosed methods, without limitation. A phone service provider for the feature phone may pre-install the application program in the feature phone and thus enable the feature phone to use the application program via any appropriate IP network.

Yet further, one of, part of, or all of the steps in the disclosed methods can be implemented via any appropriate IP network, and is not limited by a time when a caller device calls a callee device. Thus, the disclosed methods can provide further convenience. For example, certain communication protocols, such as Session Description Protocol (SDP) may allow simultaneously downloading a file during ringing prompt. However, SDP-based method requires a mobile phone to be installed with SDP and to use a service provider supporting SDP system, thus having significant limitation in users and devices. In addition, using the SDP, the file can only be downloaded at the same time of receiving a phone call and establishing a phone conversation. In the disclosed method, a portrait file can be uploaded, distributed and downloaded via an IP network at any time before receiving a phone call or establishing a phone conversation, and thus does not need to be simultaneous or synchronized with receiving a phone call and establishing a phone conversation. For example, a callee device can download a portrait file via an IP network, several hours, several days or several months before receiving a ringing prompt or establishing a phone conversation with a corresponding caller device. Therefore, the disclosed methods do not require supporting of the SDP, do not need to rely on a service provide supporting SDP, and thus are significantly more convenient.

Further, the disclosed methods can enable automatic portrait setup in an address book for user's convenience. Portraits can be selectively distributed based on caller-callee social relationship, user preference, or any other criteria.

Using the disclosed methods, through a selective distribution process and appropriate selective criteria, a notification for downloading a portrait file is sent to callee devices that are authorized to download the portrait file. The notification is thus not sent to callee devices that are not authorized to or do not need to download the portrait file. For example, in certain embodiments, when the distribution policy indicates that a callee device is authorized by the caller device to receive a portrait file, the selective distribution process can determine whether the callee device has an address book including the phone number of the caller device, that is, whether the callee is the caller's follower. When the address book includes the phone number of the caller device (i.e., the callee is the caller's follower), the callee device can receive the notification for downloading the portrait file.

Various embodiments also disclose methods for providing caller ID. The methods can be implemented by a server. The methods are described in various embodiments above, e.g., as shown in FIGS. 6A-8.

Various embodiments also disclose methods for providing caller ID. The methods can be implemented by a callee device. The methods are described in various embodiments above, e.g., as shown in FIGS. 6A-7B and 10.

Various embodiments also disclose methods for providing caller ID. The methods can be implemented by a system including a caller device, a server, a callee device, or a combination thereof. The methods are described in various embodiments above, e.g., as shown in FIGS. 3, 6A-7B, 8 and 10.

Various embodiments also disclose apparatus for providing caller ID. The apparatus can include a caller device. The apparatus includes a processor and a storage medium, and any other appropriate components. The storage medium can have encoded instructions causing the apparatus to implement the methods as described in various embodiments above, e.g., as shown in FIGS. 3 and 6A-7B.

Various embodiments also disclose apparatus for providing caller ID. The apparatus can include a server. The apparatus includes a processor and a storage medium, and any other appropriate components. The storage medium can have encoded instructions causing the apparatus to implement the methods as described in various embodiments above, e.g., as shown in FIGS. 6A-8.

Various embodiments also disclose apparatus for providing caller ID. The apparatus can include a callee device. The apparatus includes a processor and a storage medium, and any other appropriate components. The storage medium can have encoded instructions causing the apparatus to implement the methods as described in various embodiments above, e.g., as shown in FIGS. 6A-7B and 10.

Various embodiments also disclose systems for providing caller ID. The system can include a caller device, a server, a callee device, or a combination thereof, to implement the methods as disclosed in various embodiments, e.g., as shown in FIGS. 3, 6A-7B, 8 and 10.

Part or all of the steps in the methods in accordance with various embodiments can be accomplished using a program/software to instruct related hardware. The program/software can be stored in a non-transitory computer-readable storage medium including, e.g., ROM/RAM, magnetic disk, optical disk, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A method for providing caller identification (ID), implemented by a caller device having a phone number, comprising:
   creating a portrait file to be used as a caller ID representing the caller device;

generating a distribution policy corresponding to the portrait file;

sending the portrait file to a portrait distribution system (PDS) on a server via an IP network; and sending the distribution policy to a policy control system (PCS) on the server via the IP network, to cause the PCS to perform a selective distribution process including:
  selecting a callee device to be notified of the portrait file, by using the distribution policy;
  generating a notification based on the portrait file; and
  sending the notification to the callee device, such that the callee device downloads the portrait file from the PDS via the IP network according to the notification, and executes the portrait file as the caller ID when the caller device calls the callee device;

wherein:
  the downloading of the portrait file from the PDS by the callee device is before the caller device initiates a call to the callee device; and
  the downloading of the portrait file from the PDS by the callee device and the calling of the callee device by the caller device are not simultaneous or synchronized;

wherein the distribution policy corresponding to the portrait file includes: a phone number of a contact, wherein the contact is authorized by the caller device to download the portrait file from the PDS; and wherein the selective distribution process performed by PCS includes:

before selecting the callee device to be notified of the portrait file, obtaining an address book uploaded from a device corresponding to the phone number of the contact; and wherein the selecting of the callee device to be notified of the portrait file includes:
  looking up, in the address book, the phone number of the caller device;
  when the address book includes the phone number of the caller device, determining the device to be the callee device to be notified of the portrait file; and
  when the address book does not include the phone number of the caller device, determining the device not to be the callee device to be notified of the portrait file.

2. The method according to claim 1, wherein:
after the sending of the portrait file to the PDS, the method further includes:
  receiving a first response from the PDS indicating portrait upload completion, the first response including an access instruction of the portrait file, wherein the access instruction is for locating and downloading the portrait file from the PDS; and
the sending of the distribution policy to the PCS includes:
  sending the distribution policy to the PCS, the distribution policy carrying the access instruction of the portrait file.

3. The method according to claim 1, wherein the sending of the portrait file to the PDS includes:
  sending the portrait file to the PDS, the portrait file carrying a unique identifier of the portrait file, to cause the PDS to send a third response to the PCS indicating portrait upload completion, the third response including an access instruction of the portrait file and the unique identifier of the portrait file, wherein the access instruction is for locating and downloading the portrait file from the PDS; and the sending of the distribution policy to the PCS further includes:
  correlating, by the PDS, the access instruction of the portrait file with the unique identifier of the portrait file; and
  sending the distribution policy to the PCS, the distribution policy carrying the unique identifier of the portrait file, to cause the PCS to obtain the access instruction of the portrait file from the third response by using the unique identifier.

4. The method according to claim 1, wherein the portrait file contains the phone number of the caller device, such that after the callee device downloads the portrait file from the PDS according to the notification:
  the callee device automatically sets up the portrait file in an address book on the callee device via the phone number of the caller device, in order for the portrait file in the address book to be automatically executed when the caller device calls the callee device; or
  the callee device automatically executes the portrait file as the caller ID corresponding to the phone number of the caller device, by intercepting an incoming call from the caller device.

5. The method according to claim 1, wherein the sending of the notification to the callee device includes:
  pushing, by the PCS, the notification to the callee device; or
  obtaining, by the callee device, the notification from the PCS by active polling.

6. A method for providing caller ID, implemented by a server including a PDS (portrait distribution system) and a PCS (policy control system), comprising:
  receiving from a caller device, by the PDS via an IP network, a portrait file to be used as a caller ID representing the caller device, wherein the caller device has a phone number;
  receiving from the caller device, by the PCS via the IP network, a distribution policy corresponding to the portrait file; and
  performing, by the PCS, a selective distribution process including:
    selecting a callee device to be notified of the portrait file, by using the distribution policy;
    generating a notification based on the portrait file; and
    sending the notification to the callee device to cause the callee device to download the portrait file from the PDS via the IP network according to the notification and, when the caller device calls the callee device, to cause the callee device to execute the portrait file as the caller ID;
  wherein:
    the downloading of the portrait file from the PDS by the callee device is before the caller device initiates a call to the callee device; and
    the downloading of the portrait file from the PDS by the callee device and the calling of the callee device by the caller device are not simultaneous or synchronized;
  wherein the receiving of the portrait file by the PDS includes:
    receiving from the caller device, by the PDS, the portrait file carrying a unique identifier of the portrait file;
    sending, by the PDS, a third response to the PCS indicating portrait upload completion, the third response including an access instruction of the portrait file and the unique identifier of the portrait file, wherein the access instruction is for locating and downloading the portrait file from the PDS; and correlating, by the PDS, the access instruction of the portrait file with the unique identifier of the portrait file;

the receiving of the distribution policy by the PCS includes:

receiving from the caller device, by the PCS, the distribution policy carrying the unique identifier of the portrait file;

receiving, by the PCS, the third response from the PDS;

obtaining, by the PCS, the access instruction of the portrait file from the third response by using the unique identifier; and returning, by the PCS, a second response to the caller device indicating policy upload completion.

7. The method according to claim 6, wherein the distribution policy corresponding to the portrait file includes:

a phone number of a contact, wherein the contact is authorized by the caller device to download the portrait file from the PDS.

8. The method according to claim 7, wherein the selective distribution process performed by PCS includes:

before selecting the callee device to be notified of the portrait file, obtaining, by the PCS, an address book uploaded from a device corresponding to the phone number of the contact; and wherein the selecting of the callee device to be notified of the portrait file includes:

looking up in the address book, by the PCS, the phone number of the caller device; and when the address book includes the phone number of the caller device, determining, by the PCS, the device to be the callee device to be notified of the portrait file; or when the address book does not include the phone number of the caller device, determining, by the PCS, the device not to be the callee device to be notified of the portrait file.

9. The method according to claim 6, wherein the portrait file contains the phone number of the caller device, such that after the callee device downloads the portrait file from the PDS according to the notification:

the callee device automatically sets up the portrait file in an address book on the callee device via the phone number of the caller device, in order for the portrait file in the address book to be automatically executed when the caller device calls the callee device; or the callee device automatically executes the portrait file as the caller ID corresponding to the phone number of the caller device, by intercepting an incoming call from the caller device.

10. The method according to claim 6, wherein the sending of the notification to the callee device includes:

pushing, by the PCS, the notification to the callee device; or obtaining, by the callee device, the notification from the PCS by active polling.

11. An apparatus for providing caller ID, wherein the apparatus comprises a caller device having a phone number, the caller device including a processor, a storage medium, and having instructions encoded thereon, which cause the apparatus to:

create a portrait file to be used as a caller ID representing the caller device;

generate a distribution policy corresponding to the portrait file;

send the portrait file to a portrait distribution system (PDS) on a server via an IP network; and send the distribution policy to a policy control system (PCS) on the server via the IP network, to cause the PCS to perform a selective distribution process including:

selecting a callee device to be notified of the portrait file, by using the distribution policy;

generating a notification based on the portrait file; and sending the notification to the callee device, such that the callee device downloads the portrait file from the PDS via the IP network according to the notification, and executes the portrait file as the caller ID when the caller device calls the callee device;

wherein:

the downloading of the portrait file from the PDS by the callee device is before the caller device initiates a call to the callee device; and the downloading of the portrait file from the PDS by the callee device and the calling of the callee device by the caller device are not simultaneous or synchronized;

wherein the distribution policy corresponding to the portrait file includes: a phone number of a contact, wherein the contact is authorized by the caller device to download the portrait file from the PDS;

wherein the selective distribution process performed by PCS further includes: before selecting the callee device to be notified of the portrait file, obtaining an address book uploaded from a device corresponding to the phone number of the contact; and wherein the selecting of the callee device to be notified of the portrait file includes:

looking up, in the address book, the phone number of the caller device; and when the address book includes the phone number of the caller device, determining the device to be the callee device to be notified of the portrait file; and when the address book does not include the phone number of the caller device, determining the device not to be the callee device to be notified of the portrait file.

12. The apparatus according to claim 11, wherein the instructions cause the apparatus to:

after sending the portrait file to the PDS, receive a first response from the PDS indicating portrait upload completion, the first response including an access instruction of the portrait file, wherein the access instruction is for locating and downloading the portrait file from the PDS; and during the sending of the distribution policy, send the distribution policy to the PCS, the distribution policy carrying the access instruction of the portrait file.

13. The apparatus according to claim 11, wherein the instructions cause the apparatus to:

during the sending of the portrait file, send the portrait file to the PDS, the portrait file carrying a unique identifier of the portrait file, to cause the PDS to send a third response to the PCS indicating portrait upload completion, the third response including an access instruction of the portrait file and the unique identifier of the portrait file, wherein the access instruction is for locating and downloading the portrait file from the PDS; and correlate, by the PDS, the access instruction of the portrait file with the unique identifier of the portrait file; and during the sending of the distribution policy,
send the distribution policy to the PCS, the distribution policy carrying the unique identifier of the portrait file, to cause the PCS obtains the access instruction of the portrait file from the third response by using the unique identifier.

14. The apparatus according to claim 11, wherein the portrait file contains the phone number of the caller device, such that after the callee device downloads the portrait file from the PDS according to the notification:
the callee device automatically sets up the portrait file in an address book on the callee device via the phone number of the caller device, in order for the portrait file in the address book to be automatically executed when the caller device calls the callee device; or
the callee device automatically executes the portrait file as the caller ID corresponding to the phone number of the caller device, by intercepting an incoming call from the caller device.

15. The method according to claim 11, wherein the sending of the notification to the callee device includes:
pushing, by the PCS, the notification to the callee device; or
obtaining, by the callee device, the notification from the PCS by active polling.

16. An apparatus for providing caller ID, wherein the apparatus comprises a server having a PCS and a PDS, the server including a processor, a storage medium, and having instructions encoded thereon, which cause the apparatus to:
receive from a caller device, by the PDS via an IP network, a portrait file to be used as a caller ID representing the caller device, wherein the caller device has a phone number;
receive from the caller device, by the PCS via the IP network, a distribution policy corresponding to the portrait file; and
perform, by the PCS, a selective distribution process including:
selecting a callee device to be notified of the portrait file, by using the distribution policy;
generating a notification based on the portrait file; and
sending the notification to the callee device, to cause the callee device to download the portrait file from the PDS via the IP network according to the notification and, when the caller device calls the callee device, to cause the callee device to execute the portrait file as the caller ID;
wherein:
the downloading of the portrait file from the PDS by the callee device is before the caller device initiates a call to the callee device; and
the downloading of the portrait file from the PDS by the callee device and the calling of the callee device by the caller device are not simultaneous or synchronized;
wherein the instructions cause the apparatus to:
during the receiving of the portrait file by the PDS,
receive from the caller device, by the PDS, the portrait file carrying a unique identifier of the portrait file;
send, by the PDS, a third response to the PCS indicating portrait upload completion, the third response including an access instruction of the portrait file and the unique identifier of the portrait file, wherein the access instruction is for locating and downloading the portrait file from the PDS; and
correlate, by the PDS, the access instruction of the portrait file with the unique identifier of the portrait file; and
during the receiving of the distribution policy by the PCS,
receive from the caller device, by the PCS, the distribution policy carrying the unique identifier of the portrait file;
receive, by the PCS, the third response from the PDS;
obtain, by the PCS, the access instruction of the portrait file from the third response by using the unique identifier; and
return, by the PCS, a second response to the caller device indicating policy upload completion.

17. The apparatus according to claim 16, wherein the distribution policy corresponding to the portrait file includes:
a phone number of a contact, wherein the contact is authorized by the caller device to download the portrait file from the PDS.

18. The apparatus according to claim 17, wherein the selective distribution process performed by PCS includes:
before selecting the callee device to be notified of the portrait file, obtaining an address book uploaded from a device corresponding to the phone number of the contact; and
wherein the selecting of the callee device to be notified of the portrait file includes:
looking up, in the address book, the phone number of the caller device; and
when the address book includes the phone number of the caller device, determining the device to be the callee device to be notified of the portrait file; or
when the address book does not include the phone number of the caller device, determining the device not to be the callee device to be notified of the portrait file.

19. The apparatus according to claim 16, wherein the portrait file contains the phone number of the caller device, such that after the callee device downloads the portrait file from the PDS according to the notification:
the callee device automatically sets up the portrait file in an address book on the callee device via the phone number of the caller device, in order for the portrait file in the address book to be automatically executed when the caller device calls the callee device; or
the callee device automatically executes the portrait file as the caller ID corresponding to the phone number of the caller device, by intercepting an incoming call from the caller device.

20. The method according to claim 16, wherein the sending of the notification to the callee device includes:
pushing, by the PCS, the notification to the callee device; or
obtaining, by the callee device, the notification from the PCS by active polling.

21. The method according to claim 3, wherein:
the access instruction includes at least one of a uniform resource locator (URL) at which the portrait file is stored, a path for locating the portrait file in a directory or database maintained by the PDS, and an access key having a string of characters used for forming the URL or the path using a preset method.

22. The method according to claim 6, wherein:
the access instruction includes at least one of a uniform resource locator (URL) at which the portrait file is stored, a path for locating the portrait file in a directory or database maintained by the PDS, and an access key having a string of characters used for forming the URL or the path using a preset method.

23. The apparatus according to claim 11, wherein:
the access instruction includes at least one of a uniform resource locator (URL) at which the portrait file is stored, a path for locating the portrait file in a directory or database maintained by the PDS, and an access key having a string of characters used for forming the URL or the path using a preset method.

24. The apparatus according to claim 16, wherein:
the access instruction includes at least one of a uniform resource locator (URL) at which the portrait file is stored, a path for locating the portrait file in a directory or database maintained by the PDS, and an access key having a string of characters used for forming the URL or the path using a preset method.

* * * * *